(12) United States Patent
Malme et al.

(10) Patent No.: US 12,220,830 B2
(45) Date of Patent: Feb. 11, 2025

(54) METHOD AND APPARATUS FOR AUTOMATED STRIPPING OF WASTE FROM A CUT SUBSTRATE

(71) Applicant: Kongsberg Precision Cutting Systems AS, Kongsberg (NO)

(72) Inventors: Thomas Malme, Kongsberg (NO); Rune Kringstad Sandoy, Trondheim (NO); Erik Morset, Trondheim (NO); Matti Damgaard Winther, Skollenborg (NO); Morten Lind, Trondheim (NO); Lidvar Budal, Hønefoss (NO); Satish Doraiswamy Naidu, Kongsberg (NO); Sebastian Alsaker Bergsvik, Laksevåg (NO)

(73) Assignee: Kongsberg Precision Cutting Systems AS, Kongsberg (NO)

( * ) Notice: Subject to any disclaimer, the term of this patent is extended or adjusted under 35 U.S.C. 154(b) by 0 days.

(21) Appl. No.: 17/046,324

(22) PCT Filed: Apr. 8, 2019

(86) PCT No.: PCT/EP2019/058756
§ 371 (c)(1),
(2) Date: Oct. 9, 2020

(87) PCT Pub. No.: WO2019/197309
PCT Pub. Date: Oct. 17, 2019

(65) Prior Publication Data
US 2021/0094200 A1    Apr. 1, 2021

Related U.S. Application Data

(60) Provisional application No. 62/655,541, filed on Apr. 10, 2018.

(51) Int. Cl.
*B26D 7/18*     (2006.01)
*B26D 5/00*     (2006.01)
(Continued)

(52) U.S. Cl.
CPC ........... *B26D 7/1818* (2013.01); *B26D 5/007* (2013.01); *B26D 5/32* (2013.01); *B26F 1/44* (2013.01);
(Continued)

(58) Field of Classification Search
CPC ........ B26D 7/1818; B26D 5/007; B26D 5/32; B26D 2007/0018; B26D 7/18; B26D 5/34; B26D 7/1854; B31B 50/14; B26F 1/44
(Continued)

(56) References Cited

U.S. PATENT DOCUMENTS 3,055,567 A * 9/1962 Sayford, Jr. ............ B26F 3/002
225/2
3,524,364 A    8/1970 Bishop.
(Continued)

FOREIGN PATENT DOCUMENTS

DE        3938663 A1    5/1991
DE    102006036870 83    4/2008
(Continued)

OTHER PUBLICATIONS

International Search Report and Written Opinion for International Application No. PCT/EP2019/058756, dated Jul. 26, 2019, 13 pages.

*Primary Examiner* — Sameh Tawfik
(74) *Attorney, Agent, or Firm* — Robinson & Cole LLP

(57) ABSTRACT

A separator (10) for separating waste (820) from product (810; 2302) in a pre-cut substrate (2600) having one or more cut lines. An inlet feeder feeds the substrate (2600) into the
(Continued)

separator (10) along a material path. A separation edge (2500) is disposed in a location downstream of the inlet feeder and defines a line below the plane of the material path. A plurality of punch tools (30; 1800; 1900; 2000) above the plane of the material path, upstream of the separation edge (2500), each has an actuator configured to position the tool in an extended configuration with a contact end of the punch tool (30; 1800; 1900; 2000) disposed below the separation edge (2500), and a retracted configuration with the contact end disposed above the plane of the material path. A controller commands each actuator to position the corresponding punch tool (30; 1800; 1900; 2000) contact end synchronized with the position of the pre-cut substrate (2600) to cause the separation edge (2500) to separate the waste (820) from the product (810; 2302) along the cut lines.

28 Claims, 19 Drawing Sheets

(51) Int. Cl.
  *B26D 5/32* (2006.01)
  *B26F 1/44* (2006.01)
  *B31B 50/14* (2017.01)
  *B26D 7/00* (2006.01)

(52) U.S. Cl.
  CPC ...... *B31B 50/14* (2017.08); *B26D 2007/0018* (2013.01)

(58) Field of Classification Search
  USPC .......................................................... 493/342
  See application file for complete search history.

(56) References Cited

U.S. PATENT DOCUMENTS

| | | | | |
|---|---|---|---|---|
| 3,764,085 A * | 10/1973 | Hawkins | ................ | B26D 1/035 |
| | | | | 226/97.1 |
| 3,889,863 A | 6/1975 | Deslauriers | | |
| 4,530,693 A * | 7/1985 | Isowa | ................ | B26D 7/1818 |
| | | | | 83/139 |
| 4,951,537 A * | 8/1990 | Bennett | ................ | B21D 45/006 |
| | | | | 83/123 |
| 5,101,747 A * | 4/1992 | Gerber | ................ | B26D 7/1818 |
| | | | | 112/470.36 |
| 5,179,882 A * | 1/1993 | Takeuchi | ............. | B26D 7/1818 |
| | | | | 83/128 |
| 5,337,639 A * | 8/1994 | Morrison | ................ | B31B 50/16 |
| | | | | 493/83 |
| 5,826,474 A * | 10/1998 | Howard | ................. | B65H 35/06 |
| | | | | 83/423 |
| 6,092,452 A * | 7/2000 | Adami | ................... | B26D 11/00 |
| | | | | 83/425.2 |
| 6,162,161 A * | 12/2000 | De Stefanis | ......... | B26D 7/1818 |
| | | | | 493/372 |
| 6,467,382 B2 * | 10/2002 | Willits | ..................... | B26D 7/18 |
| | | | | 225/104 |
| 7,434,373 B2 * | 10/2008 | Pommier | ............. | B26D 7/1854 |
| | | | | 53/461 |
| 9,156,180 B2 * | 10/2015 | Horii | ..................... | B26D 7/1818 |
| 9,308,662 B2 * | 4/2016 | Holm | .................... | B26D 7/1818 |
| 9,688,474 B2 | 6/2017 | Dinauer et al. | | |
| 10,759,076 B2 * | 9/2020 | Grader | ....................... | B26F 1/38 |
| 11,271,403 B2 * | 3/2022 | Wei | .......................... | F03D 7/028 |
| 2002/0162437 A1 * | 11/2002 | Urabe | ................... | B26D 7/1818 |
| | | | | 83/132 |
| 2005/0274245 A1 * | 12/2005 | Biggs | ....................... | B26D 3/28 |
| | | | | 83/102 |
| 2013/0292226 A1 | 11/2013 | Ben-David et al. | | |
| 2015/0360381 A1 * | 12/2015 | Tomlinson | ............. | B26D 5/086 |
| | | | | 83/337 |
| 2022/0055783 A1 * | 2/2022 | Warrington | ......... | B65B 69/0033 |

FOREIGN PATENT DOCUMENTS

| | | |
|---|---|---|
| EP | 2008781 A1 | 12/2008 |
| GB | 858565 | 1/1961 |
| GB | 1377443 | 12/1974 |
| GB | 1396008 | 5/1975 |
| WO | 2013084602 A1 | 6/2013 |

\* cited by examiner

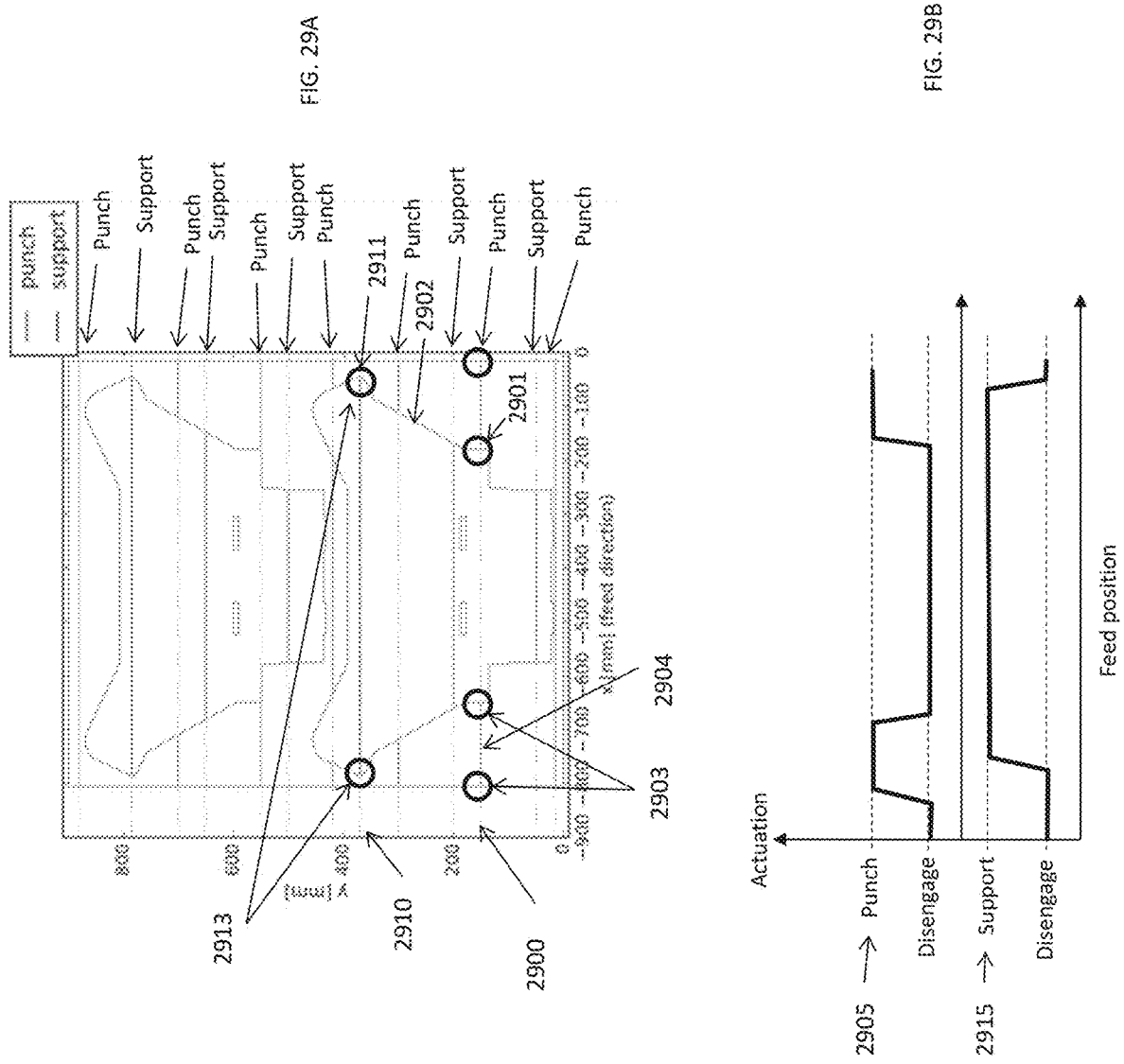

METHOD AND APPARATUS FOR AUTOMATED STRIPPING OF WASTE FROM A CUT SUBSTRATE

CROSS-REFERENCE TO RELATED APPLICATIONS

This is the U.S. National Phase of International Application No. PCT/EP2019/058756, filed Apr. 8, 2019, which claims priority to U.S. Provisional Application No. 62/655, 541, filed Apr. 10, 2018. The disclosure of each of these applications is incorporated herein by reference in its entirety for all purposes.

BACKGROUND OF THE INVENTION

Substrates are routinely digitally converted (e.g. cut and creased according to a digital job-description file, such as in the creation of packaging). The digital job-description file typically contains product shapes defined by cut paths, crease paths, and other metadata that may define attributes of the conversion job. The substrate may also have printed data codes, including but not limited to barcode or QR-codes, which enable a vision system to automatically capture the job to be performed and link this to a job-description file. The substrate is typically first creased with one or more computer-controlled crease tools along predefined folding lines according to a crease path and then cut in the same or another station with one or more computer-controlled cutting tools according to a predefined cut path. The cut and crease paths/shapes are typically defined in a digital job-file read by the computer-controlled crease and/or cut machines. The cutting process typically results in cut shapes, some of which is the desired product and some of which is waste. It is normally desirable to remove the waste and sort/stack the products.

In order to implement a fully-automated digital conversion process for processing substrates, such as cardboard or corrugated board, it is desirable to have a method of waste stripping that enables automatic waste product removal. Such automated waste product removal may have various benefits, including but not limited to increasing converting process efficiency, reducing or eliminating the need for manual work, automating the handling of waste products, or a combination thereof.

SUMMARY OF THE INVENTION

One aspect of the invention is a method for automated waste stripping of cut substrates (e.g. packaging blanks) using punch and support tools. In one embodiment, the tools are positioned transversely to the feed direction and actuated in synchronization with the substrate's actual feed position. The punch and support tool paths are determined by processing the waste/product geometry defined in a digital job description file. Coordination with the digital job description file enables automatic waste product removal in a digital substrate conversion process without the need to make custom stripping tools or manual intervention, as is required for conventional die-stripping methods. One aspect of the invention comprises a separator for separating waste from product in a pre-cut substrate, the apparatus comprising an inlet feeder, a separation edge, a plurality of punch tools, each controlled by an actuator, and controller configured to command each punch tool actuator. The inlet feeder is configured to feed a pre-cut substrate into the separator along a plane that defines a material path in a material feed direction. The pre-cut substrate has one or more cut lines that define a boundary between product and waste. The separation edge is disposed in a location downstream of the inlet feeder along the material path and defines a line positioned below the plane of the material path. The plurality of punch tools are disposed above the plane of the material path, upstream of the separation edge. Each punch tool actuator is configured to position the punch tool in an extended configuration in which a contact end of the punch tool is disposed below the separation edge, and a retracted configuration in which the contact end of the punch tool is disposed above the plane of the material path. The controller is configured to command each punch tool actuator to position the corresponding punch tool contact end synchronized with the position of the pre-cut substrate relative thereto to cause separation of the waste from the product at the separation edge. The separation edge may comprise the leading edge of a wedge. The separator may further comprise a plurality of support tools disposed below of the plane of the material path, upstream of the plurality of punch tools, each support tool comprising an actuator configured to position a contact end of the support tool in an extended configuration in which the contact end of the support tool is disposed above the separation edge, and a retracted configuration in which the contact end of the support tool is disposed below the plane of the waste material path, in which case the controller is further configured to command each support tool actuator to position the corresponding support tool contact end synchronized with the position of the pre-cut substrate relative thereto to cause separation of the product from the waste at the separation edge. An outlet feeder for transporting the product along a product path downstream of the separation edge and a waste handler disposed beneath the separation edge for receiving the waste may also be provided.

The separation wedge may have an adjustable wedge angle, an adjustable longitudinal position between a position in which the separation edge is relatively closer to the punch tools and a position in which the separation edge is relatively further from the punch tools, an adjustable distance relative to the plane of the material path, or a combination thereof.

In some embodiments, at least one of the inlet feeder or the outlet feeder comprises a pair of cooperating conveyors disposed on opposite sides of the plane of the material path and configured to contact the substrate. At least one of the pair of cooperating conveyors may be an active conveyor configured to transfer directional force to the substrate or product and at least one of the cooperating conveyors may comprise a roller. In some embodiments, at least one of the cooperating conveyors is a conveyor belt. At least one of the inlet feeder or the outlet feeder comprises an actuator configured to move at least one of the pair of cooperating conveyors into and out of an engaged configuration in which the substrate is compressed between the cooperating conveyors.

Some embodiments may have a machine vision system configured to detect a position of the substrate in the separator. The machine vision system may be configured to detect one or more edges of the substrate, and the job description file may contain information defining the separation edge relative to the substrate edges. The machine vision system may be configured to detect registration marks, the job description file may contain information defining the separation edge relative to the registration marks, and the pre-cut substrate may be marked with the registration marks in a machine-readable form. The machine vision system may be configured to detect a leading edge of the waste and a leading edge of the product. In embodiments in which the separation wedge has an adjustable position, the controller may be configured to move the separation edge laterally upstream or downstream and/or vertically closer or further from the material path to facilitate separation of the product from the waste based upon the detected positions of the leading edge of the waste and the leading edge of the product.

At least one processor connected to the controller may be programmed with instructions for providing actuation commands to the controller synchronized with information indicative of substrate position. In such embodiments, the actuation commands comprise at least one of: instructions for the punch tool and support tool actuators or instructions for operating the inlet and outlet feed conveyors. The processor may be programmed with instructions for reading a job description file corresponding to the pre-cut substrate and deriving actuation commands from the cut lines in the job description file. In embodiments with machine vision systems, the processor may be configured to receive and process information from the machine vision system relating to positions of the leading edges of the waste and the product and to send actuation commands to the controller for moving the separation wedge based upon those positions.

The plurality of punch tools and the plurality of support tools are preferably adjustable in a transverse, longitudinal or vertical direction, or a combination thereof. The contact ends of the plurality of punch or support tools may comprise rollers or yielding ends configured to give in response to forces having a vector in a direction of material travel along the material path. Air nozzles connected to a source of pressurized air disposed relative to the plurality of punch tools may be operative to direct a stream of air toward the substrate to separate waste from the product in the pre-cut substrate.

In some embodiments, a fixed waste guide comprising transversely spaced guide portions may be configured to guide a peripheral waste frame into the waste handler without use of a punch tool. The transversely spaced guide portions of the waste guide may be each mounted on a carrier configured to adjust a transverse distance between the guide portions.

The separator may be a module in a workflow having at least one other module located upstream or downstream thereof, including but not limited to equipment for performing cutting, creasing, printing or a combination thereof, equipment for performing gluing, sorting, stacking, or a combination thereof, and equipment for waste handling. Preferably, the workflow includes upstream cutting equipment configured to create a tapered cut defined by a non-perpendicular angle between the top surface and the bottom surface of the material.

Another aspect of the invention comprises a method for separating waste from product in a pre-cut substrate. The method comprises feeding a pre-cut substrate into the separator along a plane that defines a material path in a material feed direction, the pre-cut substrate comprising one or more cut lines that define a boundary between product and waste. A separation edge is provided in a location downstream of the inlet feeder along the material path and defined by a line located below the plane of the material path. A plurality of punch tools are actuated, each configured to cause a contact end of the punch tool to urge a waste portion of the pre-cut substrate to pass below the separation edge. Actuation of the plurality of punch tools is synchronized with a position of the pre-cut substrate, such that the actuation causes separation of the product from the waste at the separation edge.

The method may further include receiving in a processor a job description file that defines the cut lines corresponding to the pre-cut substrate and deriving, via the processor, actuation commands based upon the cut lines in the job description file. The actuation commands are communicated to a controller configured to control the plurality of punch tools and a feeder for controlling position of the substrate relative to the pluralities of punch tools. The method may further include actuating a plurality of support tools configured to cause a contact end of the support tool to urge a product portion of the pre-cut substrate to pass above the separation edge, transporting the product along a product path downstream of the separation edge, and transporting the waste along a waste path different from the product path.

Yet another aspect of the invention comprises a computer implemented method for generating instructions for separating waste from product in a cut substrate using a separator apparatus. The method includes receiving, with a computer processor, a job description file containing information defining geometric boundaries of one or more cut lines in the substrate and receiving, with the computer processor, information defining the separator apparatus. The information defining the separator may include a number, respective positional locations, and actuation speed of actuators for actuating tools configured to guide the product or waste portions of the substrate relative to a separation edge when actuated, and motor controls for controlling positional location of the substrate relative to the tools and speed of the substrate along a material path. The method may include deriving, with the computer processor, a set of actuation commands for the tool actuators and the motor controls based upon the information received from the job description file and the information defining the separator apparatus, and saving or transmitting the actuation commands to means for executing the actuation commands. The means for executing the actuation commands may be an execution module stored on a computer in communication with a separator apparatus controller in communication with the tool actuators and the motor controls. The execution module may also be in communication with sensors integrated with the separator apparatus that provide feedback information from the separator apparatus indicating an expected or actual location of the substrate in the separator apparatus. Feedback information may include machine vision information relating to relative locations of leading edges of the waste and the product. Actuation commands may include command for moving the separation edge based upon those relative locations. In a system in which one or more of the tools or the separation edge are adjustable in at least one direction, the actuation commands may further include commands for making an adjustment of the one or more tools or the separation edge. In a system in which one of the one or more adjustable tools or separation edge are manually adjustable, the command for making the adjustment may be transmitted to a user interface to communicate to a human operator a need to make the adjustment. In a system in which one or more adjustable tools or the separation edge are automatically adjustable and the controller is configured to command at least one actuator for making the adjustment, the command for making the adjustment is transmitted to the controller. In embodiment in which one or more adjustable tools or separation edge are automatically adjustable on the fly while at least a portion of the substrate is in process, the system may be configured to transmit the command for making the adjustment to the controller in real time.

BRIEF DESCRIPTION OF THE DRAWINGS

FIGS. 29A and 29B respectively depict an exemplary set of cutlines corresponding to a cut shape and a depiction of instructions for controlling a processor based thereon.

DETAILED DESCRIPTION OF THE INVENTION

Referring now to the figures, an exemplary waste separator embodiment 10, also referred to herein as a "waste puncher" or a "stripper," is depicted in accordance with one aspect of the invention. Separator 10 comprises a feed system, such as comprising plurality of intake conveyors 20, including upper intake roller 25 and lower intake roller 27, for supporting a pre-cut substrate (e.g. a sheet of cardboard) to be processed as it is fed into the separator along a material feed path A.

Figure 1:
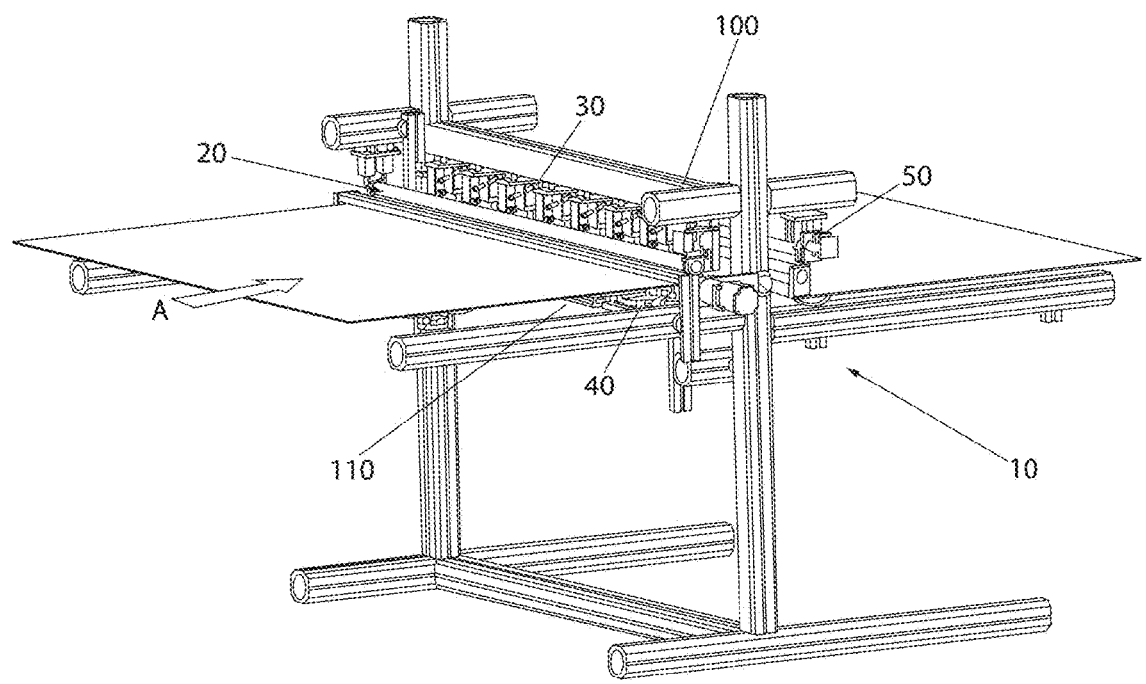
FIG. 1 is a schematic perspective view of an exemplary waste separator embodiment according to one aspect of the invention.
Figure 2:
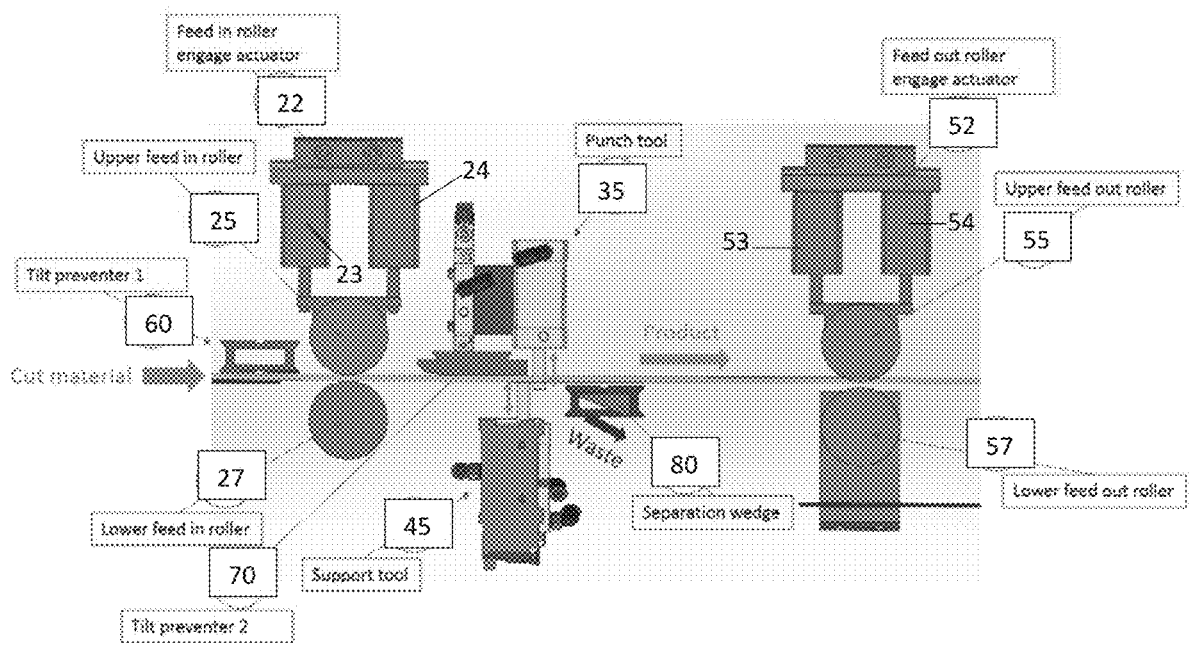
FIG. 2 is a schematic side view of details of the exemplary waste separator of FIG. 1.

The term "conveyor" as used herein refers to any component configured to contact the substrate and convey it along the material path, including but not limited to rollers, conveyor belts, and the like. Actuator 22, depicted as comprising two pistons 23 and 24, such as air cylinders, connected to upper intake roller, is configured to move the upper intake roller from an engaged position in contact with the substrate, and a non-engaged position not in contact with the substrate. One of the intake rollers may be an active roller that provides motive force to the substrate when engaged, with the other roller being a passive roller that only provides rolling support for the substrate. The active roller may be operable using a stepper motor, for example. As depicted in FIGS. 1 and 2, the active roller is preferably the lower roller, and the passive roller is preferably the upper intake roller, because of its configuration to move into and out of the engaged position.

Compression of the substrate between the upper and lower roller 25 and 27 creates a frictional engagement. To prevent slipping of the material on the one or both of the rollers, which may otherwise cause loss of position control, a friction enhancing material may be provided on the contact surface of the roller. Suitable friction enhancing materials include natural or synthetic rubber materials, which may be adhered to the roller with adhesive or applied as a spray coating. The friction enhancing materials provided on the upper roller versus the lower roller, where both have such materials, may have different coefficients of friction. The friction enhancing materials may extend the entire transverse length of the roller over the entire diameter thereof, or may cover the roller in a striped or spiral pattern comprising friction enhancing materials separated by portions without such materials. The use of friction enhancing materials may also be used to compensate for deviations in straightness of the rollers.

Figure 22:
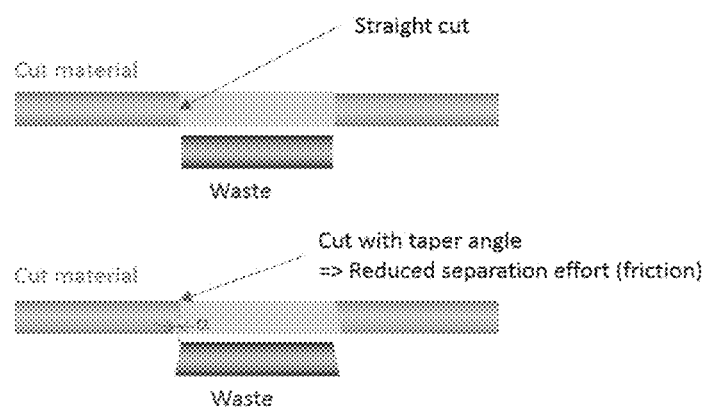
FIG. 22 is a schematic drawing depicting an exemplary taper angle cut in a substrate.

The substrate has been pre-cut by a cutting tool, but the product and waste portions of the substrate are now in need of separation. In preferred embodiments, the substrate may be cut at a taper angle to facilitate the separation of product and waste, as depicted in FIG. 22. The "taper angle" refers to an angle α, that is slightly angled from vertical relative to the plane of the substrate as shown in FIG. 22. The use of a taper angle reduces the separation effort required to punch the waste. Thus, in an ideal workflow system comprises the separator as described herein, also comprises a cutter configure to make tapered cuts. Preferably the taper angle α defines an outline of each waste section that defines a slightly larger area on the underside of the substrate than on the topside of the substrate (in the system depicted in FIG. 1 in which the waste is intended to be received on the underside of the substrate). In other embodiments, however, even a taper angle that defines a cut line that angles upstream from top to bottom surface relative to the material travel direction may have advantages over a perpendicular cut angle. While most systems will typically be oriented so that separation of the waste is enhanced by gravity tending to pull the waste away from the substrate, the invention is not limited to any particular orientation of the substrate relative to gravitational pull. Thus, to the extent used herein, including in the claims, relative terms such as "above," "below," "underneath," "vertical," "horizontal," "right," "left" and the like refer to the orientations depicted in the figures, and are not intended as absolute terms. Accordingly, in configurations in which the bottom of the figure is not necessarily parallel to the ground, such relative terms do not necessarily correspond to, and should not be interpreted as limiting, absolute terms in space relative to the ground.

A plurality of product outlet conveyors 50, including upper outlet roller 55 and lower outlet roller 57, support the separated product as it is led away from the puncher. The construction of the outlet conveyors may be similar to that of the inlet conveyors. Actuator 52, depicted as comprising two pistons 53 and 54, which may be air cylinders, connected to upper outlet roller, is configured to move the upper outlet roller from an engaged position, in which the upper outlet roller is in contact with the substrate, and a non-engaged position, in which the upper outlet roller is not in contact with the substrate. One of the outlet rollers may be an active roller that provides motive force to the substrate when engaged, with the other roller being a passive roller that simply provides rolling support for the substrate. The active roller may be operable using a stepper motor, for example. To prevent slipping of the material on one or both of the rollers, which could cause loss of position control, a high friction material may be disposed on the contact surface of one or both of the rollers, similar to the intake rollers. The intake conveyors and outlet conveyors may be identical to one another, or may be different from one another with respect to the use or degree of friction enhancement provided and/or with respect to the overall construction of the conveying systems.

An array of punch tools 30, including a plurality of punch pistons 35 positioned above the substrate along the material path, and a plurality of support tools 40, including a plurality of support pistons 45 positioned beneath the substrate along the material path, respectively guide the product and corresponding waste above and below the separation edge, which is the leading edge of wedge 80 as the substrate is fed past the array. Product is typically guided above the separation edge and continues in the feed direction, while waste is typically diverted below the separation edge into a waste handling path.

Figure 24B:
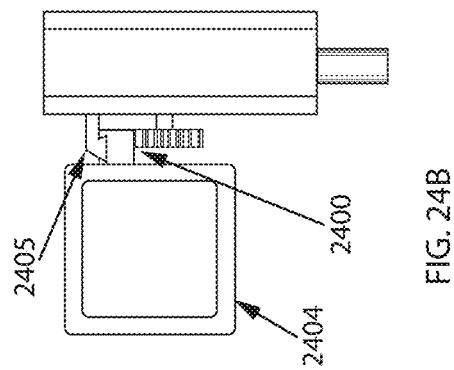
FIGS. 24A-24C are schematic drawings depicting a front plan view, a side view, and a perspective view of an exemplary adjustment system for exemplary tools as described herein.
Figure 24A:
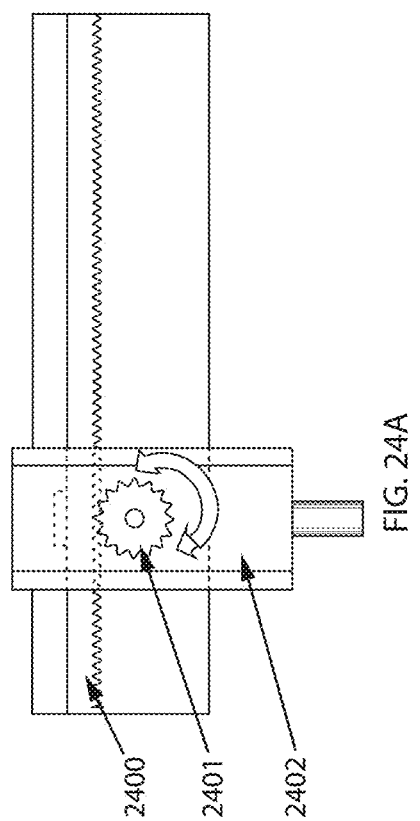
Figure 24C:
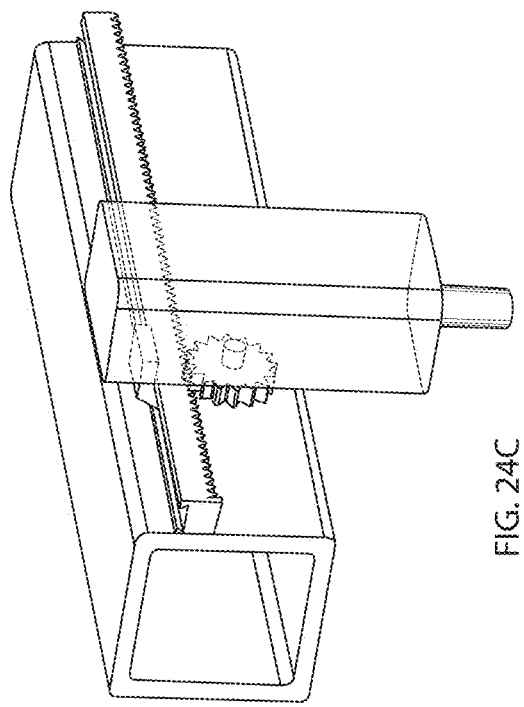

Each punch tool may be mounted to a crosspiece 100 extending transversely over the substrate. Similarly, each support tool may be mounted to a crosspiece 110 extending transversely underneath the substrate. Each punch tool and each support tool may be adjustable transversely to adapt to the cut geometry so that they can be adjusted consistent with the job description. For example, in certain embodiments, the tools may be mounted on a linear track extending in the transverse direction and may have a locking mechanism to keep them in a stable position. One exemplary embodiment is depicted in FIGS. 24A-24C, as described herein further below. The punch and support tools may be manually or automatically adjustable in the transverse direction, including automatically adjustable, controlled by the controller, including automatically adjustable on the fly, if such functionality is desirable and practical for the speed and materials desired. For example, in an exemplary system depicted in FIGS. 24A-24C, a drive system, such as but not limited to a rack 2401 and pinion 2400 system, and a linear guide system may support the tools while being moved. Each tool may be equipped with a dedicated drive mechanism, such as but not limited to an electric motor with a pinion that engages with a rack, that moves it in the traverse direction. A position encoder for each tool may be provided to keep track of and control its actual position on the traverse. The contact end of each punch tool may comprise any type of interface known in the art, including an end having a rounded configuration, an elastomeric component that provides some "give", a roller, or other geometries, as may be dictated by the needs of the materials being processed.

As described in more detail with reference to FIGS. 24A-24C, actuator 2402 has a pinion 2401. Rack 2400 is mounted on beam 2404 along which actuator 2402 is moveable. By controlled rotation of the pinion 2401, and meshing of the teeth on the pinion with the teeth in the rack, the desired position of the actuator 2402 is achieved on the beam. A guiding mechanism 2405 interfaces with a channel on the topside of the rack to permit a sliding motion while supporting the actuator 2402. In an automatic system, a motor (not shown) operates the pinion to move the actuator transversely from one position to another. In a manual system, a brake (not shown) may prevent rotation of the pinion in a fixed position, which brake may be released to permit the pinion to rotate such that the actuator may be moved along the rack to a desired position, and the brake reapplied.

One or more tilt preventers 60, 70 may be positioned along the path of the substrate, such as on opposite sides of the intake rollers. For example, as the substrate is fed through the machine, it may have a tendency to tilt (lift from the feed in table) upstream of the rollers due to the rotational forces introduced by the separation process. Tilt preventer 60 may be provided to restrict the possible range of substrate motion of the material before the intake rollers. A chamfer machined on the leading edge (left as shown in FIGS. 1 and 2) of tilt preventer 60 may minimize the risk of the substrate hooking onto the leading edge of the tile preventor. Similarly, the substrate may also be inclined to tilt in the area between the inlet rollers and the separation edge. Tilt preventer 70 may be provided to restrict the possible range of substrate motion in this area. A chamfer machined on the leading edge of this tilt preventer may also minimize the risk of the substrate hooking onto the leading edge of the tile preventor.

The waste areas of a substrate to be cut are typically defined in a digital job-description file containing product shapes, cut paths, crease paths and metadata that defines attributes of the conversion job. For example, as shown in FIG. 4, the digital job description file (JDF) includes an outline of the exemplary product shapes, 400 and waste shapes 402. As further described herein, in preferred embodiments, a processor uses the JDF as an input and derives punch lines 410 and support lines 420 relative to the cut lines. The punch lines 410 and support lines 420 correspond to the positioning of the corresponding punch tools or support tools when the corresponding portion of the substrate passes above or below the respective tools. In preferred embodiments, as described further herein, computer 300 is configured to read the job description file and is programmed with an algorithm that creates commands for the punch tools and support tools corresponding to the punch lines and the support lines, based upon the product shape. Once the punch lines and support lines have been defined, those lines are translated by the computer into instructions for the actuators that control the punch tools and the support tools, and those instructions are passed by the computer to a controller for the actuators. In other embodiments, however, the job description file may include defined punch lines 410 and support lines 420 prior to being read by computer 300.

Figure 27:
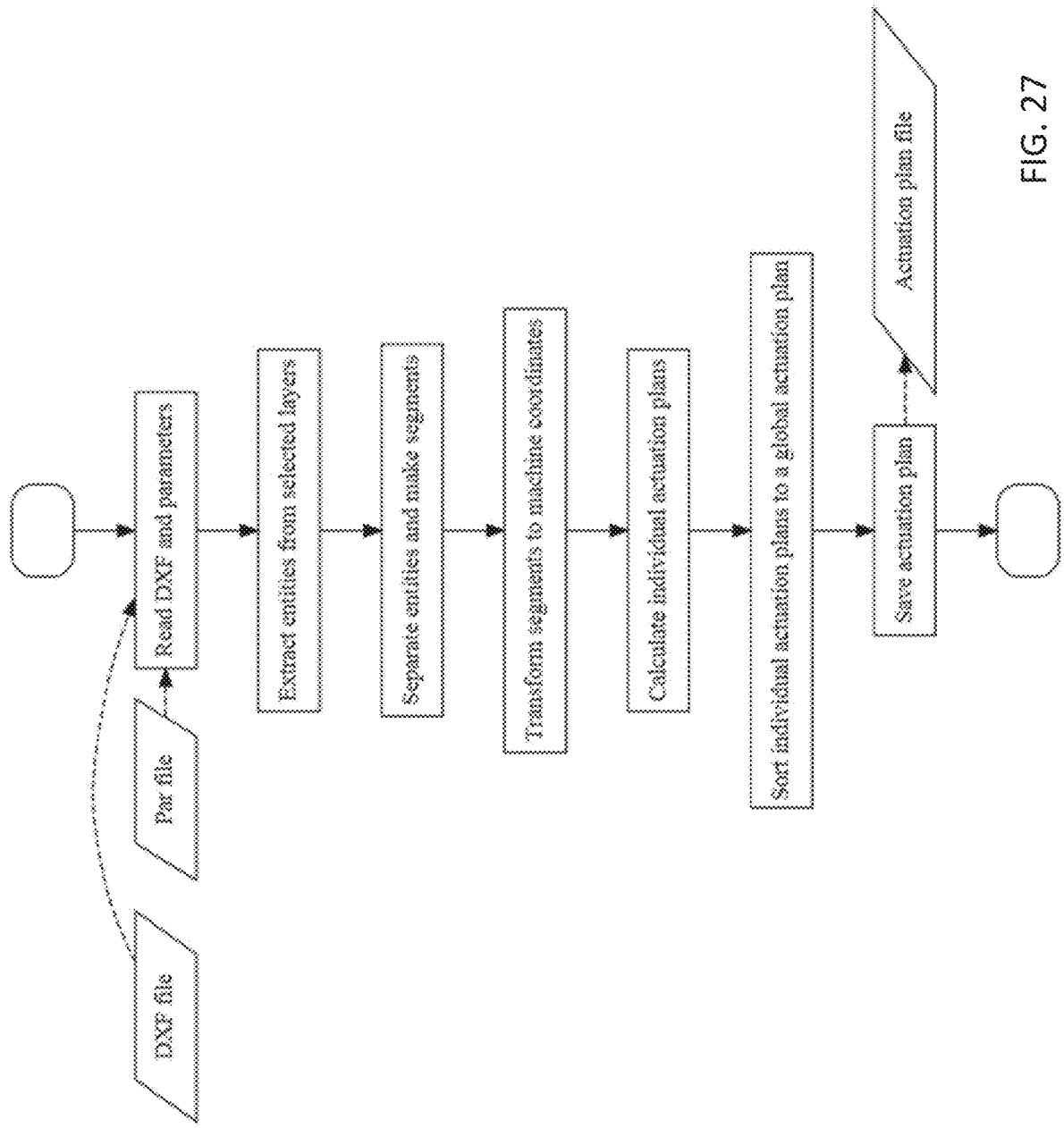
FIG. 27 is a flowchart depicting a portion of an exemplary process embodying aspects of the invention.

An exemplary algorithm for creating commands for the punch tools and support tools is depicted in FIG. 27. A digital job file (in this example, file type DXF) contains layers with different geometry features, e.g. CUT and CREASE features. The features are defined by entities such as straight lines, arcs, circles and points according to the file format. These are extracted (read) by the algorithm, sorted, sequenced, formed into segments and transformed into machine coordinates. The individual tool actuation plan (tool path) depends on whether the tool has a punch or support function, and is calculated from geometrical analysis of crossings between product and waste areas of the cut sheet along the projected contact point of the tool with the sheet as the sheet is fed past the tool. The global actuation plan is a total of all of the actuation plans for all of the tools.

The individual actuation plan may be derived for a punch tool in a specific transverse position, by calculating for each tool all crossings 2901 between tool line 2900 and feature segments 2902. The crossings are grouped in pairs 2903, all of which then define an actuation segment 2904. For each punch tool actuator, an actuation plan 2905, consisting of points of either activation (punch) or deactivation at given feed positions of the machine, may now be calculated from its actuation segments. Similarly the actuation plan for a support tool in a specific transverse position for the tool may be defined by identifying all crossings 2911 between tool line 2910 and feature segments 2902. First and last crossings (at the edges of the sheet) may be disregarded, and internal crossings may be grouped 2913 in pairs as for the punch tool. For each support tool actuator an actuation plan 2915, consisting of points of either activation (support) or deactivation at given feed positions of the machine, may now be calculated from its actuation segments. The individual actuation plans are synchronized to the sheet feed position. The result is a machine punch/support actuator motion plan.

In one embodiment, the position of the support and punch tools in the transverse direction may be set by a human operator to a job dependent fixed position by an intuition-based, manual procedure and according to various guidelines. One such guideline is to position an actuator in alignment with any "protruding" features, namely any portion the product/waste that is leading towards the separation edge, such as for example, the protruding finger 1500 in FIG. 15, which has a support tool aligned with it. Another guideline is to avoid a space between adjacent actuators that is so large that the displacement from the actuators influences an extended part of the edge between the actuators. For example, a spacing of approximately 200 mm was found to be reasonably effective.

Figure 28:
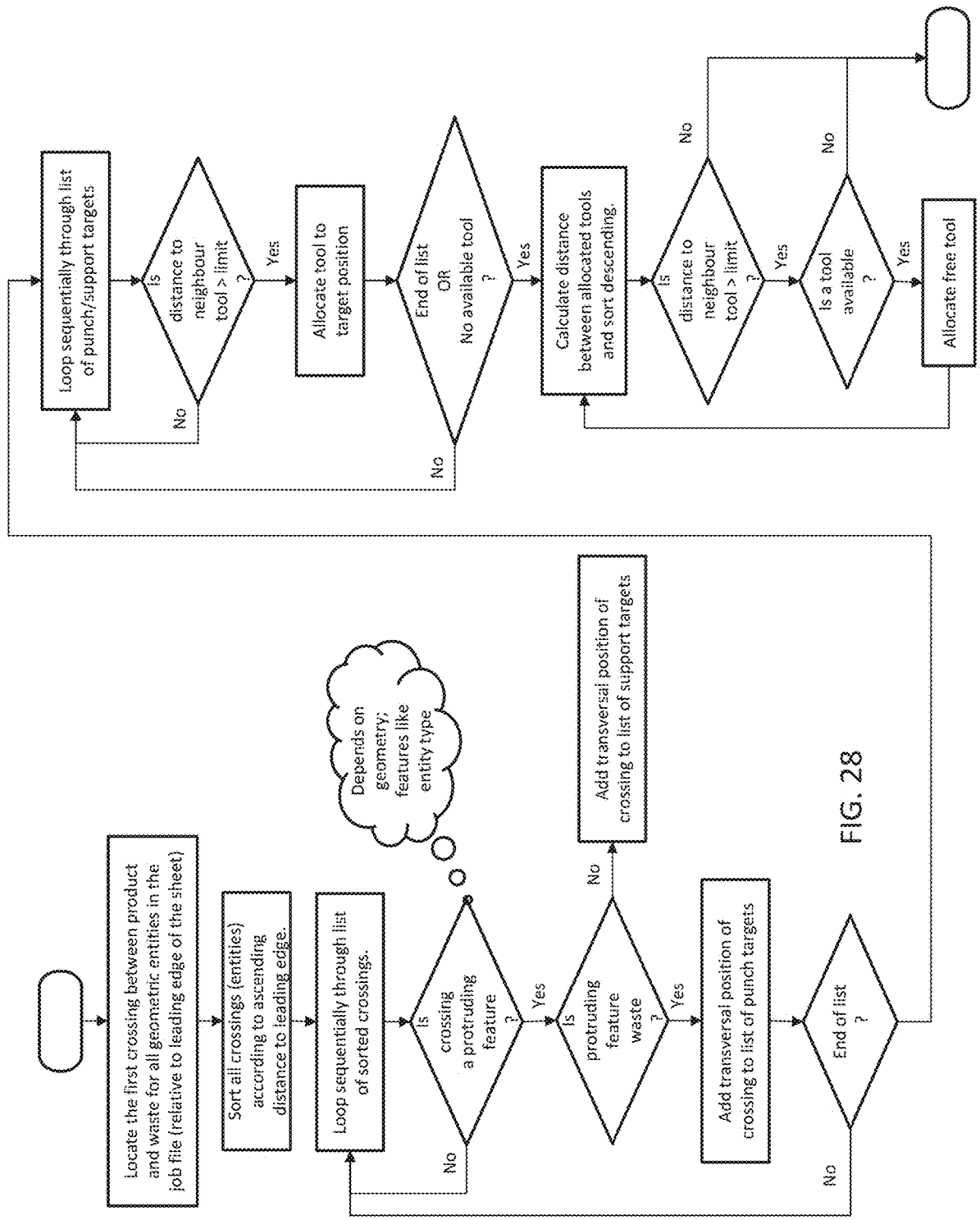
FIG. 28 is a flowchart depicting an exemplary algorithm for converting information corresponding to cutlines in a substrate to instructions for the tools of an exemplary embodiment of the invention as described herein.

Thus, in one embodiment, the punch and support tool positions are predetermined, such as by a human operator, and the algorithm derives the tool activation plan based upon predetermined locations for the tools. In other embodiments, the algorithm may define recommended positions for transverse placement of tools, based upon a machine determination of protruding features in accordance with geometrical parameters such as width and size of area. An exemplary algorithm for determining transverse tool placement using a machine algorithm is provided in FIG. 28.

Figures 4A, 4B:
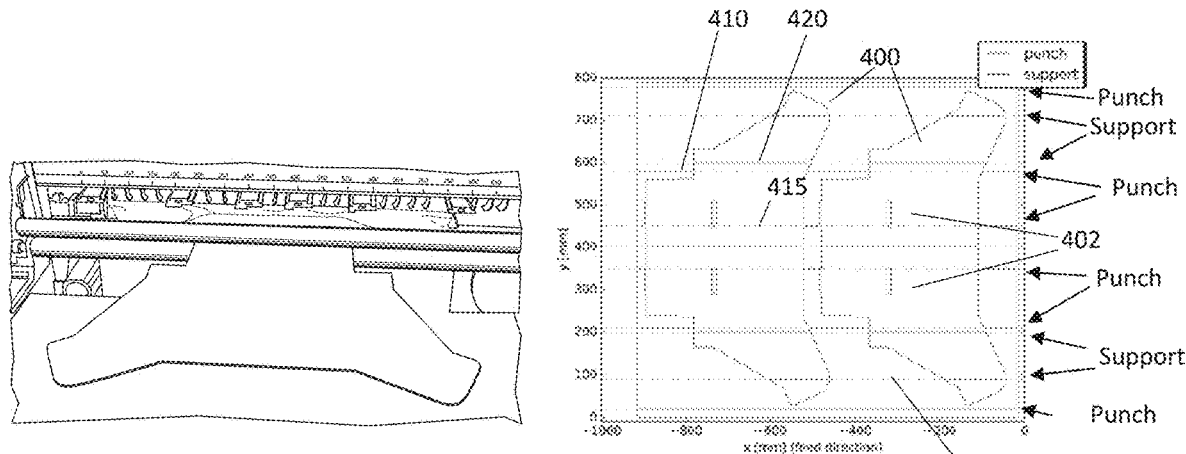
FIG. 4A is a schematic drawing showing a product shape suitable for use with the exemplary waste separator of FIG. 1.
FIG. 4B is a schematic drawing showing exemplary dimensions of the product shape of FIG. 4A in the feed direction in a direction transverse to the feed direction, showing punch lines and support lines.

For example, as shown in FIG. 4B, a solid punch line corresponds to the punch tool being in a contact position with the substrate (e.g. a position in which the punch tool is in an extended configuration in which the contact end of the tool pushes the waste section in contact therewith below the separation edge, as depicted in FIG. 2). A dotted punch line corresponds to the punch tool being in a non-contact position (e.g. a position in which the punch tool is in a retracted configuration in which the end of the tool is not in contact with the substrate). Similarly, a solid support line corresponds to the support tool being in an extended (contact) position with the substrate to guide the product from beneath to guide the portion of the product in contact therewith above the separation edge, and a dotted support line corresponds to the support tool being in a retracted position relative to the substrate positioned below the plane of the material path. Thus, when the punch and/or support tools in the respective arrays are extended, they create a shear stress in the substrate at the cut lines that causes separation of the waste from the product, and the tools respectively urges the product above the separation edge and the waste below the separation edge.

FIGS. 11-17 depict additional exemplary product shapes and corresponding punch lines and support lines, with punch lines, which signify a punch tool in the extended position, being depicted as solid lines located outside the cut line defining the periphery of the product (or inside a cut line defining the periphery of the waste) and the support lines, which signify a support tool in the extended position, being depicted as solid lines located inside the cut line defining the periphery of the product (and outside any cut lines defining periphery of the waste). Conversely, dotted lines located inside the cut line defining the periphery of the product (and outside a cut line defining the periphery of the waste) signify a punch tool in the retracted position, and dotted lines located outside the cut line defining the periphery of the product (or inside a cut line defining the periphery of waste) signify a support tool in the retracted position.

Figure 12:
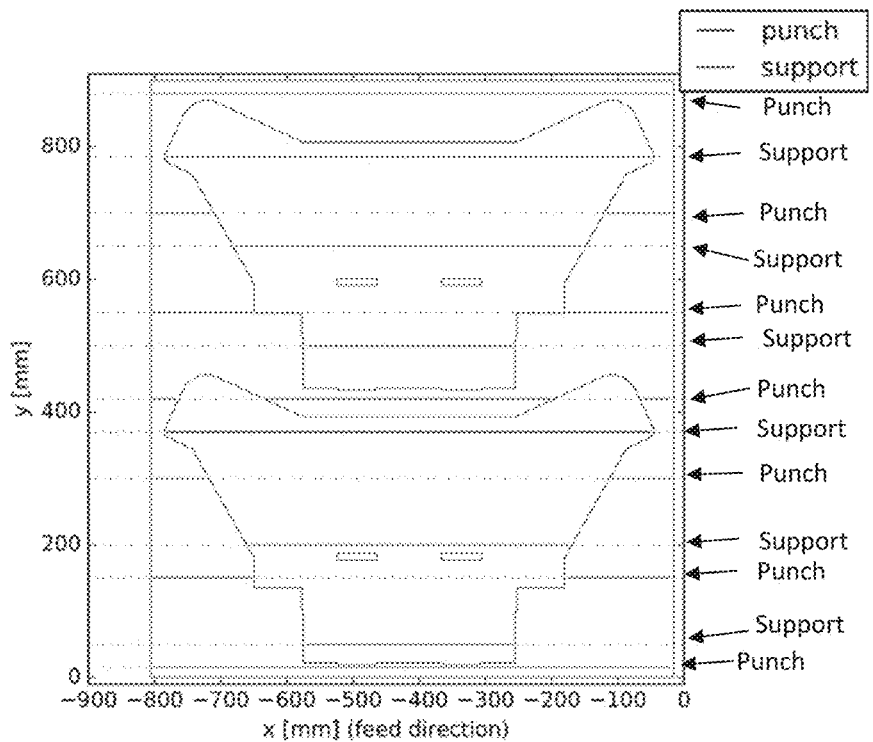

Notably, certain product geometries may benefit from a particular orientation when through the separator. For example, the product shapes shown in FIG. 4B and FIG. 12 are identical, but the orientations are 90 degrees off. Users may find that one orientation performs better than another. This may be particularly true with respect to the product shape shown in FIG. 11, in which the product (and corresponding waste) comprises a plurality of fingers extending in a direction aligned with the material path, in which a 90 degree rotation would place the fingers in an alignment perpendicular to the material path, making separation potentially more difficult.

Figure 13:
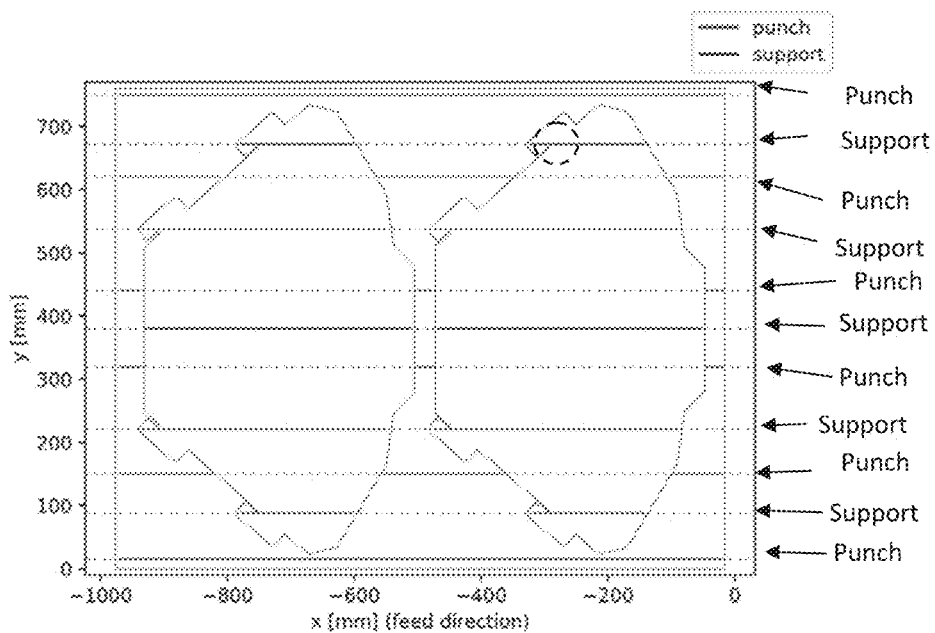

The configuration shown in FIG. 13 shows an encircled area of challenging geometry in which a small peninsula of waste extends into the product periphery. Such geometries may benefit from the use of air nozzles or may benefit from the use of strip cuts to separate the larger chunks of waste from more challenging pieces, which may have to be separated by other means (or may stay with the product until product assembly).

Figure 14:
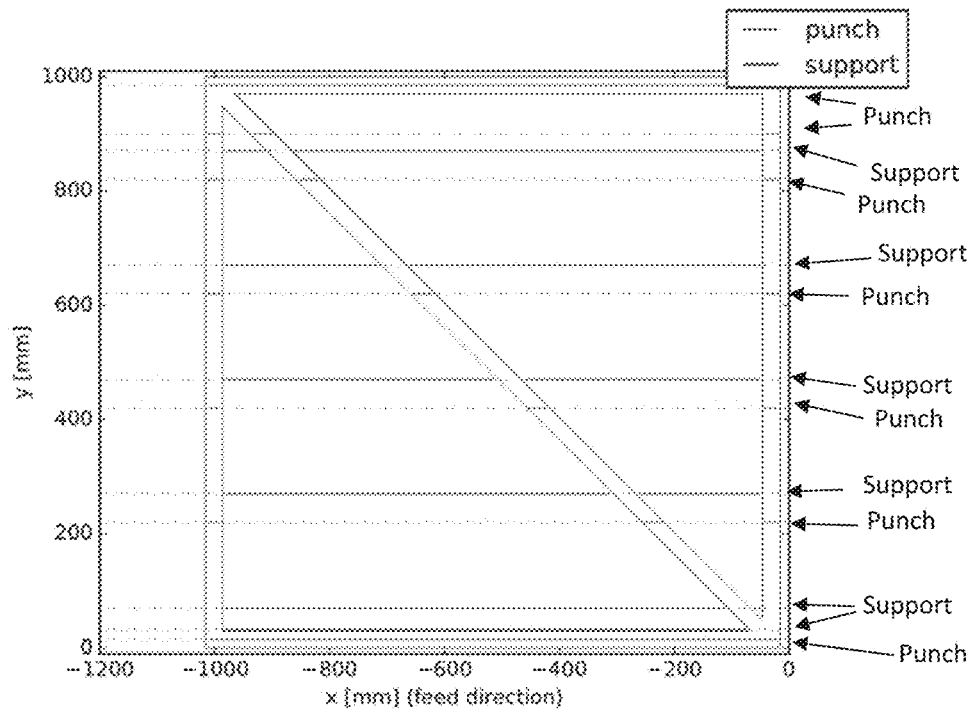

FIG. 14 illustrates a geometry in which only a short distance of punch tool extension is required between the product shapes. The speed at which the substrate is fed through the machine may be slowed down to facilitate more efficient punching over relatively short distances for waste areas having a relatively smaller extension along the feed direction relative to speeds adopted for punching waste having a relatively larger extension along the feed direction. The speed may be adjusted dynamically based on a computer algorithm or input from a knowledge database, to adapt intelligently to the waste geometry. For embodiments with a dynamically controllable inlet feeder speed, the product and waste conveyor outlet speeds may be coordinated with the inlet feed rate for smooth operation. A dynamic feed rate may also be useful for embodiments that permit adjustment of machine parameters, such as wedge or tool position, on the fly, by slowing down the feed as necessary to facilitate completion of such repositioning before the new position is required by the subject substrate geometry.

Figure 15:
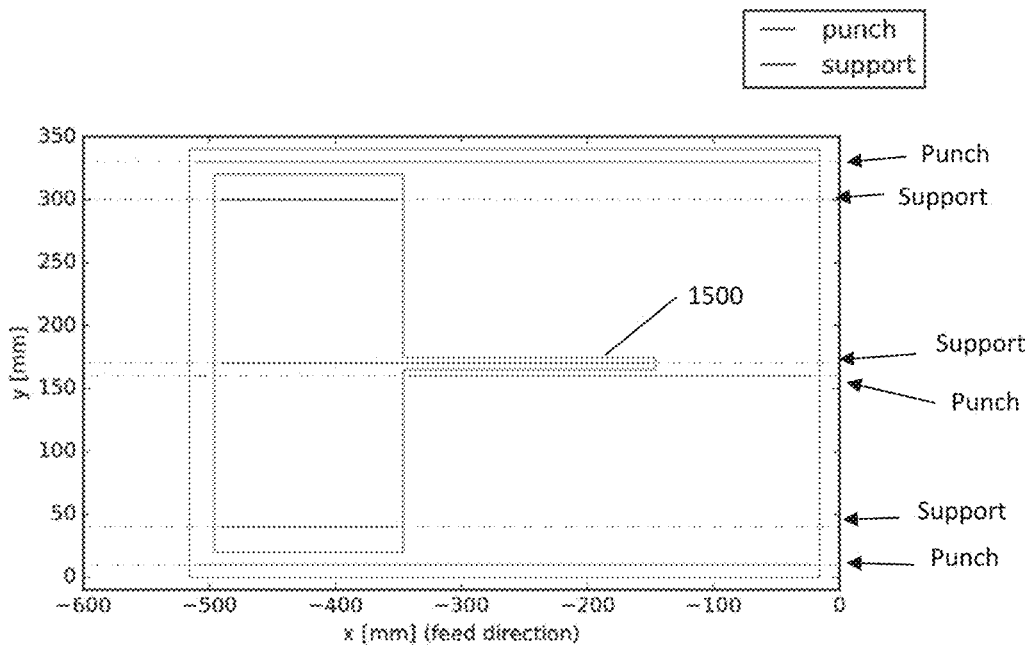
Figure 16:
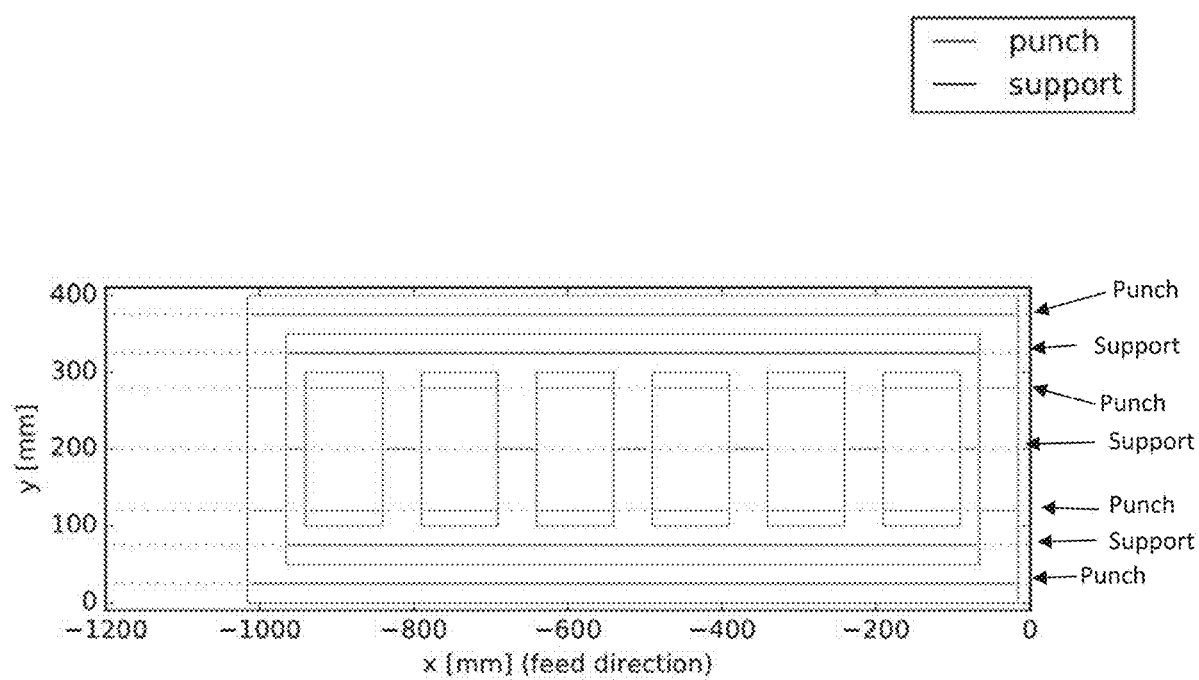

Configurations such as that shown in FIG. 15 illustrates the importance of optionally being able to transversely adjust the support or punch tools to align with narrow strips of product (as shown), or waste (not shown). Other product shapes, such as those shown in FIGS. 16 and 17 may benefit from use of a roller or ball-bearing type contact end. Designs with multiple pieces of waste, such as that shown in FIG. 16, may benefit from an efficient waste removal system that minimizes any tendency for waste to accumulate, such as a system with a waste feed roller or conveyor system that actively pulls the waste into a waste collection system, including embodiments that also perform shredding of the waste.

Figure 17:
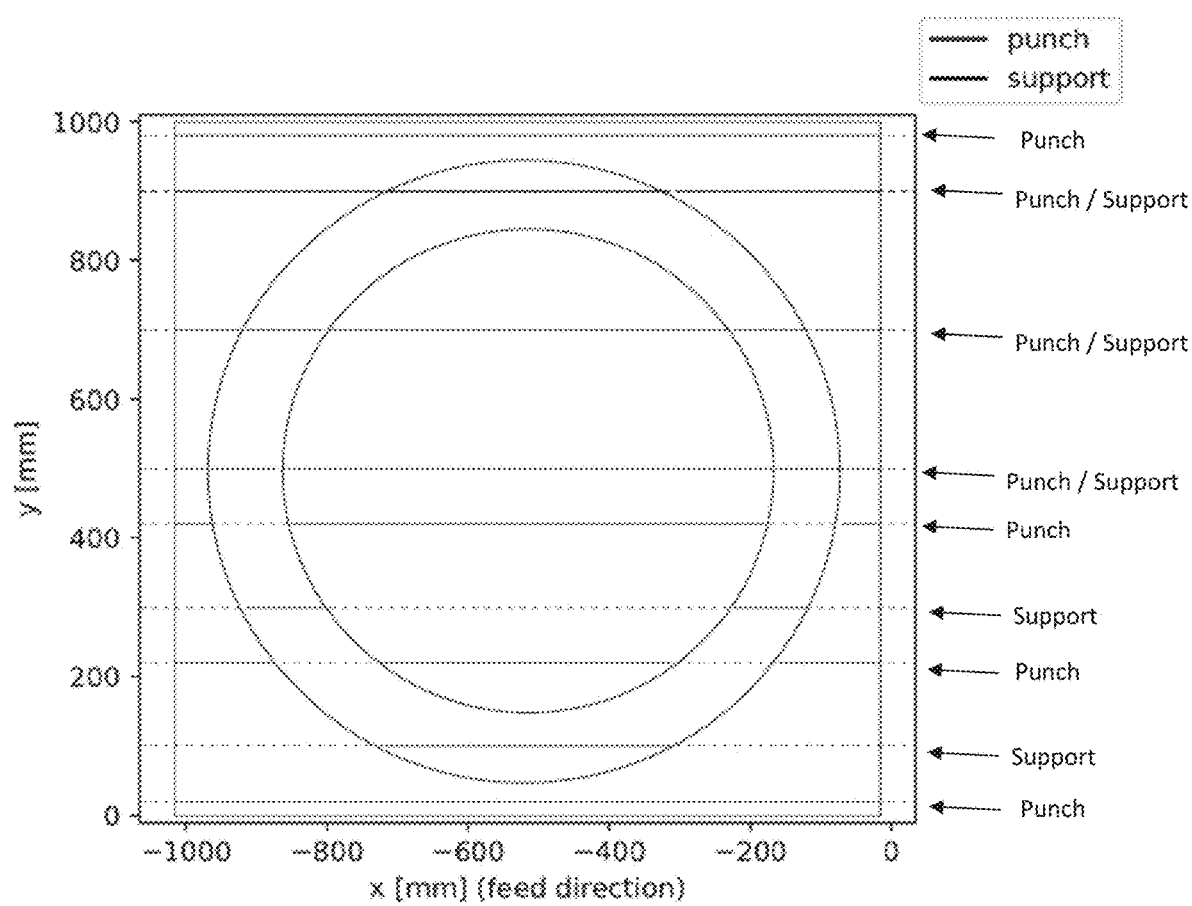

Although illustrated in most embodiments with the punch and support lines laterally offset from one another, for certain lines in certain geometries in which the punch and the support tools are not actuated to be in contact with the substrate at the same time, such as for the lines so labeled in FIG. 17, the punch and support tools may be vertically aligned with one another such that the punch and support lines overlap. As depicted in FIG. 17, the support tools are in contact with the substrate within the area between the two circles, whereas the punch tool is in contact with the substrate within the area between the square outline and the outer circle.

Figure 26:
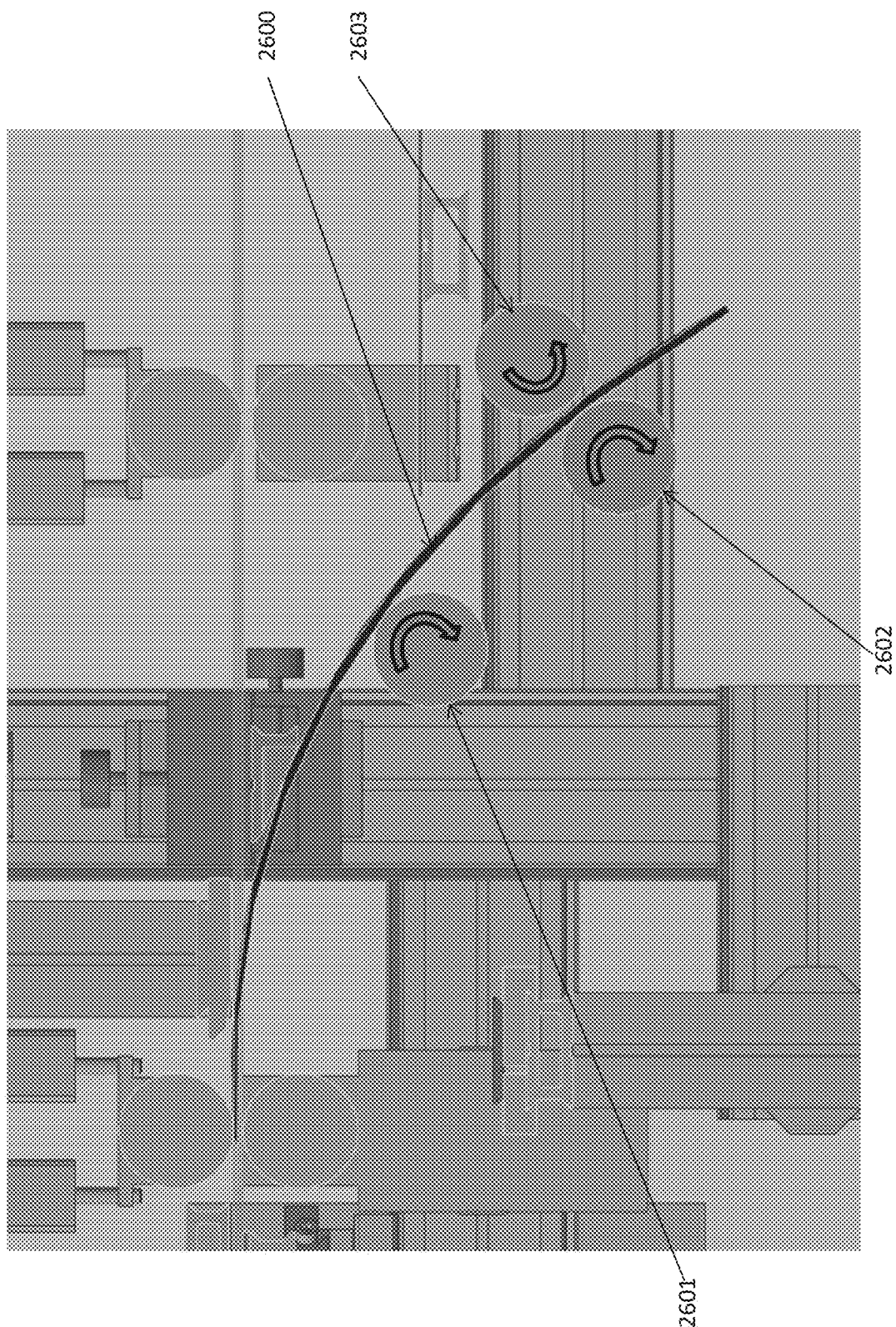
FIG. 26 is a schematic drawing depicting an exemplary waste handling system associated with an embodiment of aspects of the invention.

Referring now to FIG. 26, downstream substrate 2600 tends to separate the substrate along cut lines, but also poses a risk of jamming the flow of the substrate through the stripping machine. In the exemplary waste collection system depicted in FIG. 26, to minimize jamming, downstream waste portion of the substrate 2600 may be supported by support surfaces 2601 and 2602, which may comprise rollers, such as passive rollers. In some systems, the downstream waste portion of the substrate may benefit from an active pull, in which case an additional active roller 2603 that grips the substrate and pulls it out in synchronous with feeding elements of the machine.

The information in the digital job description file, such as expressed in vector based geometry as is known in the art (e.g. using the DXF-file standard), is read by a computer 300, which processes the information regarding waste areas and product areas, and creates instructions for actuators controlling the punch and support tools, synchronised to the substrate position. The computer may also control a plurality of actuators that control the substrate feed and product outlet conveyor systems as well as the punch and support tools, and may compare the expected substrate position to the actual substrate position based upon feedback to ensure real-time accuracy of the waste stripping tools relative to the actual substrate position. The control system is described in more detail herein later with reference to FIG. 3.

The substrate position may be initialized by first aligning the substrate relative to the feed path in a predetermined position, such by aligning a plurality of registration marks in a registration position corresponding to the substrate initial position, or by aligning the edges of the substrate in the substrate initial position. Such alignment may be performed manually or automatically, such as by using cameras and computers programmed to recognize edges and/or registration marks, as are known in the art. From the initial position, the substrate is then engaged by the intake feed system and the distance of substrate travel can be controlled based upon the diameter of the active conveyor and the number of revolutions and position of that conveyor relative to its starting position. Additionally, the actual substrate position relative to the waste-punching tools can be detected using a vision system reading printed marks on the substrate or reading one or more edges of the substrate.

Although described herein with inlet rollers as the conveyors for moving and controlling the substrate position along the pre-defined path to move it past the array of punching tools 30 and support tools 40, any means for advancing and controlling the substrate position may be provided. Similarly, although described herein with outlet rollers 50, any means or method for moving and controlling the desired product along a pre-defined outlet path may be provided. For example, in one embodiment, rather than rollers, a more gentle feed and/or outlet system may comprise conveyor belts, which provide a larger contact area with the relevant portion of the substrate or product sections. Each conveyor belt may comprise upper and lower conveyor belts disposed above and below the substrate/product, or a single conveyor belt disposed underneath the substrate.

The actuated waste removal punch tools 35 and support tools 45 are computer controlled to extend and retract according to a path/trajectory determined by the computer algorithms from the job-description file, and synchronized in real-time to the substrate actual and/or calculated position. Each waste removal punch 35 and support tool 45 is actuated to position its contact end normal to the feed direction of the substrate, and a controller commands the actuator to move each tool to a target tool position calculated by a computer algorithm based on the digital job-description. The actuators for the punch and support tools may comprise any mechanism for extension or retraction known in the art, including linkages, cams, pneumatic, hydraulically, or electrically controlled pistons, and the like. In short, the punch and support tools may be controlled by any type of actuator known in the art using any type of motive force. The punch and support tools may be movable between only binary positions (fully extended or fully retracted), or may be movable between a plurality of positions between the fully extended or fully retracted positions.

The puncher may also include one or more components for guiding punched-out waste product to a waste-collection repository, such as a separation wedge 80 positioned along the feed path after the array of punch tools 30. Separation wedge 80 is disposed downstream of the punch and support tools such that when the edge of the waste portion of the substrate is pressed below the separation edge by a punch tool located upstream of the leading edge of the separation wedge, all the trailing waste material will follow below the separation wedge. Similarly, when the product portion of the substrate is pressed above the separation edge by a support tool located upstream of the leading edge of the separation wedge, all the trailing product material will follow above the separation wedge.

Figure 25A:
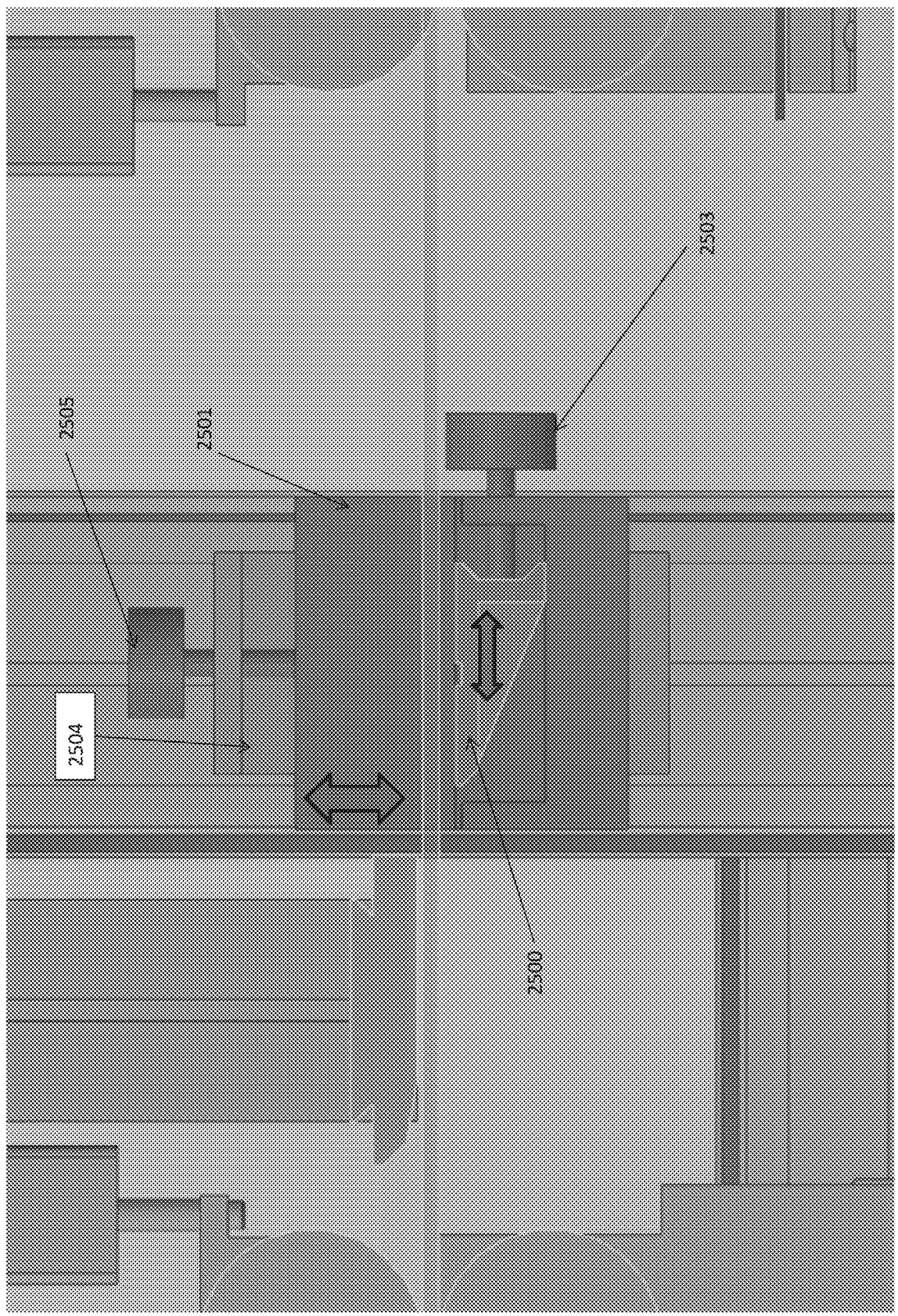
FIG. 25A-25B are schematic drawings depicting an exemplary adjustable wedge associated with one exemplary embodiment of the invention.
Figure 25B:
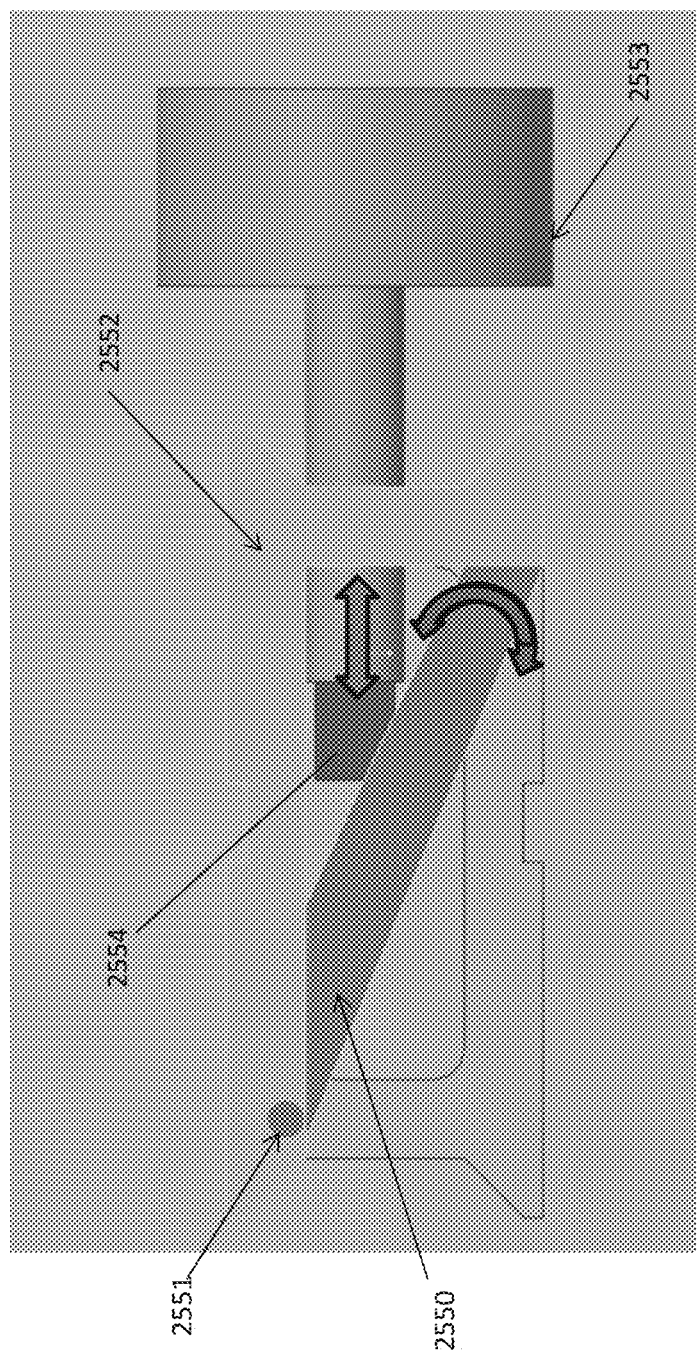

The shape or orientation of wedge 80 may be adjusted either manually or automatically to increase or decrease the wedge angle relative to the plane of the material path and the wedge position in the machine relative to the punch tool array 30 to optimize the efficiency of the waste split functionality. As used herein, the term "separation edge" refers to the leading edge of the separation wedge 80. Although a wedge configuration is desirable, because the angle of the wedge continues to provide separation after the split of product from waste at the separation edge, it should be understood that the separation edge may be disposed on a member that is not limited to a wedge-shaped (i.e. generally triangular) cross section. In other embodiments, the cross-sectional area of the member providing the separation edge may have a wedge-shaped portion that transitions to a non-triangular geometry at the trailing edge of the wedge-shaped portion. Referring now to FIGS. 25A, an exemplary separation edge unit 2500 is configured to slide along horizontal plane in the block 2501 to provide horizontal positioning. The separation edge unit 2500 may be positioned in horizontal direction by thumb screw/motorized actuator 2503. Block 2501 may be configured to slide along vertical plane in another block 2504. Block 2501, and thus of separation edge unit 2500, may be positioned in the vertical direction by the thumb screw/motorized actuator 2505. As depicted in FIG. 25B, the separation edge unit 2500 may be hinged at location 2551 to block 2552, thus providing it with a variable separation angle. A thumb screw/motorised actuator 2553 may control the angular position of the separation edge 2500 by moving extender 2554 inward or outward in engagement with the separation edge.

Figure 5:
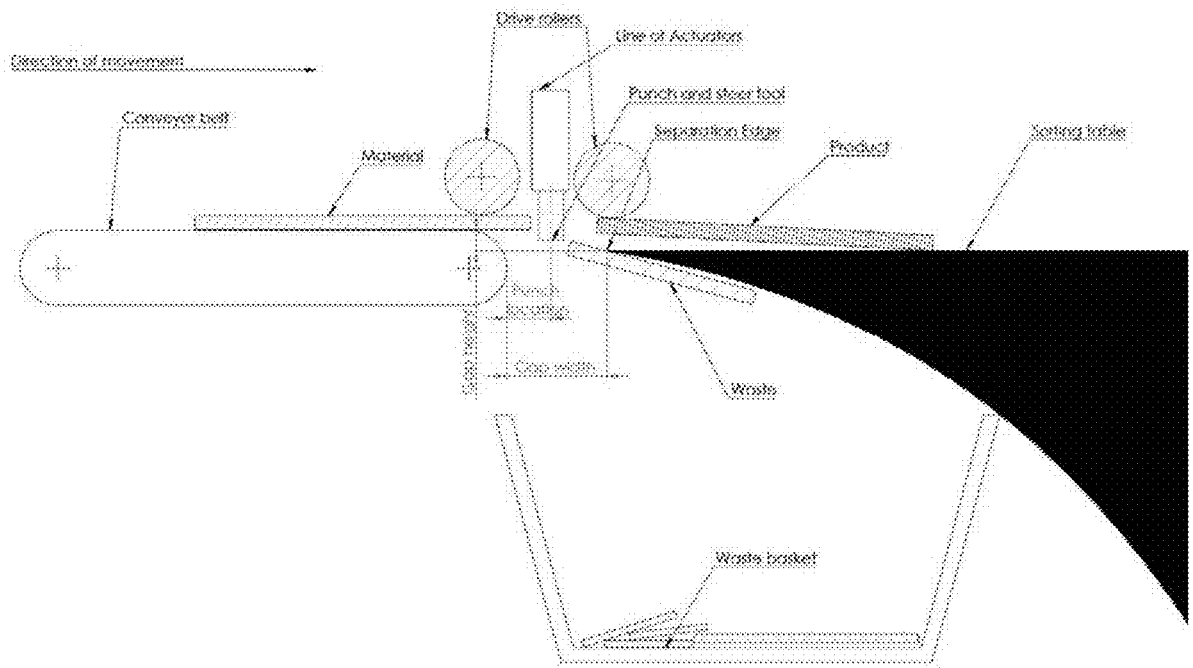
FIG. 5 is a schematic drawing depicting a close-up of another exemplary waste separator embodiment.

Referring now to FIGS. 5-8, various embodiments and relationships between the substrate and the separation edge are shown. FIG. 5 schematically depicts an embodiment comprising a conveyor belt as a bottom component of the intake feed system, and a drive roller located above the substrate material ("material"). In the embodiment shown, only punch tools are depicted. While some embodiments may have only punch tools, FIG. 5 should be understood to be applicable also to preferred embodiments having both punch tools above and support tools below the substrate material, with the support tools not depicted to avoid clutter in the drawing. As shown in FIG. 5, this embodiment may also only have a top product outlet roller with the machine configured to deposit the product on a sorting table on the downstream side of the separation edge. The separation edge in this embodiment is disposed on the leading edge of a wedge-shaped portion of the sorting table. Notably, the wedge shape depicted in FIG. 5 (as well as depicted schematically in FIGS. 6-8) is curved in nature, having a relatively less steep angle at the separation edge, and a relatively steeper angle downstream of the separation edge. Thus, the term "wedge" as used herein is not limited to a perfectly triangular cross section, and covers the shapes shown in FIGS. 5-8 as well. Again, while some embodiments may lack a product outlet conveyor, the arrangements shown in FIG. 5 should be understood to also be applicable to embodiments that have upper and lower product outlet conveyors as well as to preferred embodiments that have separation wedges that are discrete and not integrated into a downstream sorting table for the product.

FIG. 5 depicts several geometric relationships applicable to many embodiments, including embodiments with a discrete wedge, including a gap width between the trailing edge of the inlet conveyor and the separation edge, and a punch tool location within that gap. Although not shown, in embodiments with a support tool, the support tool is also located in that gap. Also depicted is a gap height between plane defining the bottom contact surface the product outlet (which is depicted in FIG. 5 as the top surface of the sorting table, but in other embodiments may be the top surface of a lower outlet conveyor configured to contact the underside of the product) and the plane defining the bottom contact surface of the substrate inlet (depicted in FIG. 5 as the top surface of the conveyor belt).

Figure 6:
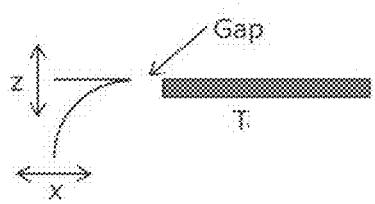
FIG. 6 is a schematic drawing illustrating the interface with the separation edge.

It should be understood that the gap width and gap height may be adjustable to account for different types of substrates. For ease of adjustability, embodiments in which the wedge is the leading edge of a sorting table are less preferred. FIG. 6 also shows (for a material path having a direction of movement from right to left, opposite that depicted in FIG. 5), a separation wedge that is adjustable in the X or Z directions to provide such adjustability of the gap width and gap height.

Figure 7:
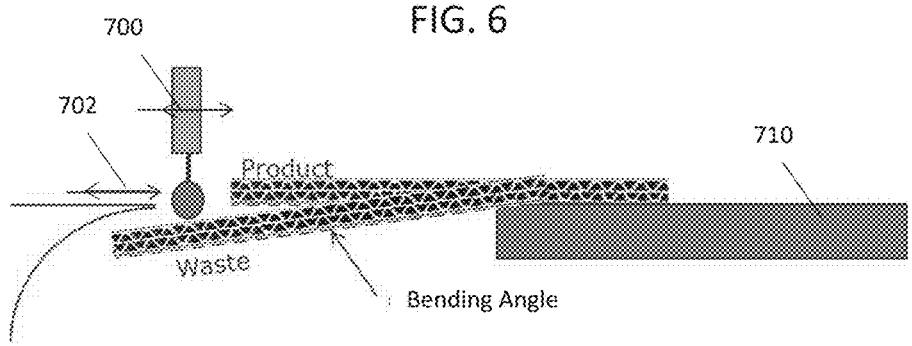
FIG. 7 is a schematic drawing illustrating the interface between an exemplary puncher, the separation edge, and the waste angle.

FIG. 7 depicts another embodiment, in which the product is moving right to left, and arrows 700 and 702 represent adjustability of the punch tools and the separation edge, respectively, in the leading or trailing direction (along the X axis depicted in FIG. 6). Such adjustability may be particularly useful to accommodate relatively stiff substrates. For example, for thick and stiff materials, the gap may be set relatively larger to minimize the angle the waste-material needs to bend, both to limit the amount of force needed and avoid scuffing the product. For products that are small and in danger of falling down in the gap, the wedge may be moved towards the table as soon as the lip of the waste has correctly been routed under the wedge. When moving the wedge, the actuators may follow to ensure they are as close to the wedge as possible to minimize the bending angle. Thus, in some embodiments, the position of the separation edge (and thus the separation wedge, if the separation edge is so disposed) and the position of the punch and/or support tools may be adjustable on the fly to accommodate product and waste geometry. Preferably, the separation wedge in embodiments that are movable, particularly in embodiments movable on the fly, are relatively low mass discrete wedge components that can be moved with minimal force, although the invention is not limited to preferred embodiments. In most embodiments, adjustability of the wedge between jobs to account for a particular material may be sufficient, rather than needing to move on the fly. Thus, the separation wedge may be manually adjustable, although even in embodiments without on the fly adjustment capability, automated adjustment increases the ease of adjustability.

Figure 8:
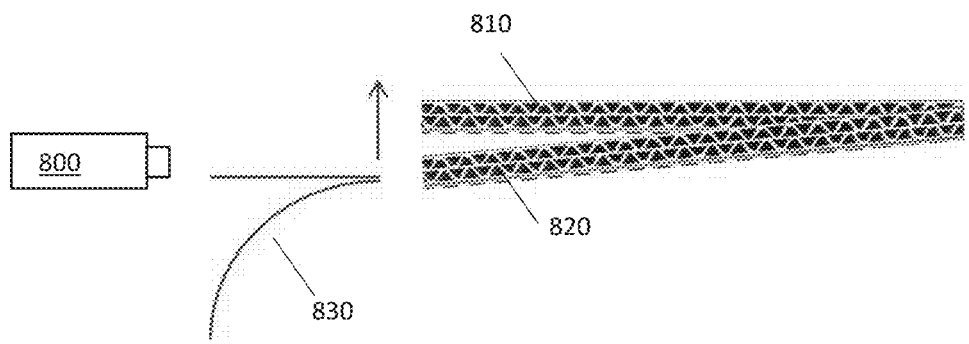
FIG. 8 is a schematic drawing illustrating an embodiment comprising a camera and a vertically adjustable separation wedge.

In some embodiments, depicted in FIG. 8, a vision system comprising a camera 800 attached to a processor (not shown) may be used for detection of the leading edge of the relevant product or waste portion of the substrate and adjust the gap height (and/or width) to ensure the separation edge is positioned correctly. In general, the separation edge should be positioned a bit lower than the inlet material path so the product does not hook onto the wedge if it gets slightly bent downwards. A vision system comprising camera 800 positioned on the trailing side aligned with the top surface of the wedge 830 may detect the relative position of the leading edges of the waste 820 and the product 810 and adjust the height of the wedge accordingly so that the waste stays under the separation edge and the product rides above the separation edge. Camera 800 may be part of an overall vision system configured to detect the absolute position of the substrate and to provide feedback for error handling. If the product is not properly separated and bends down together with the waste, the vision system may detect this, and may cause the controller to instruct the actuators controlling the inlet feed to rewind and try again.

Although shown in the various embodiments with a single bank of punch and support tools and wedges, it should be understood that some embodiments may have multiple rows of separating stations, each comprising one of the punch, support, and wedge configurations described herein. In particular, multiple arrays of tools may be attractive for cutline geometries (e.g. having fine punched details), which would require the tools to be very closely positioned or closer than the tool build space allows. In such a case, the tools may be allocated on different arrays to avoid the position conflict (clash) of adjacent tool. In some embodiments, a first row of tools may comprise tools for relatively coarser separation and a second row of tools may comprise tools for relatively finer separation, such as a first row of punch tools with a rigid, rolling, or semi-stable pivotable end, and a second row of air nozzle punch tools.

Figure 9:
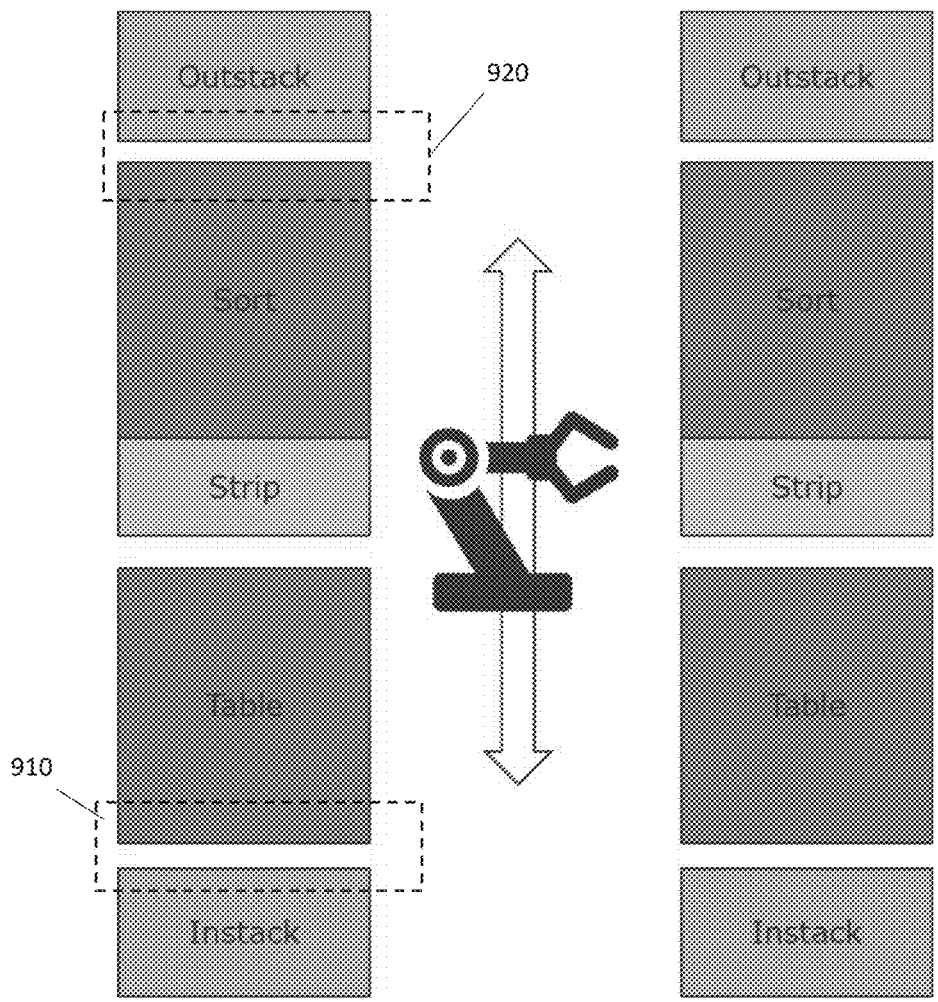
FIG. 9 is a schematic drawing illustrating exemplary interfaces among an exemplary separator and other components of a workflow.

Referring now to FIG. 9, the separator module (marked "Strip" in the Figure) may be part of a larger workflow. Upstream modules may include cutting and stacking ("Instack") for processing in the separator, and downstream processing in a typical workflow may comprise stations for sorting ("Sort"), stacking ("Outstack"), gluing (not shown) or other processing (automated or manual) of the desired product. In one embodiment, depicted in FIG. 9, a robot may provide material handling of substrates for one or multiple machines, including placing substrates on the "Table" (where they are picked up by an inlet feed system such as depicted herein) and moving the resulting product output from the separator to the next station. In other embodiments, signified by the boxes formed of dashed lines 910 and 920, rather than a robot, a sheet feeder 910 may transport substrates from the instack location to the separator feed system, and a product unloader 920 may transport product from the location downstream of the separator (which may be a sorting table in some embodiments, or a product outlet conveyor as depicted in other embodiments, herein). In still other embodiments, the "Instack" and "Outstack" modules may not be present, and the pre-cut substrate and finished product may be manually transported to the upstream and from the downstream sides of the separator.

Thus, the puncher may be a freestanding apparatus, or may comprise a module of a larger machine positioned downstream of a cutting module and/or upstream of one or more other modules. The waste-stripping apparatus may be in-line with upstream and downstream equipment constituting a complete digital converting process. The upstream equipment may include, but is not limited to, equipment for performing cutting, creasing and printing operations. The downstream equipment may include, but is not limited to, equipment for performing gluing, sorting, stacking of the product and equipment for waste handling, such as shredders or compacters.

Figure 10:
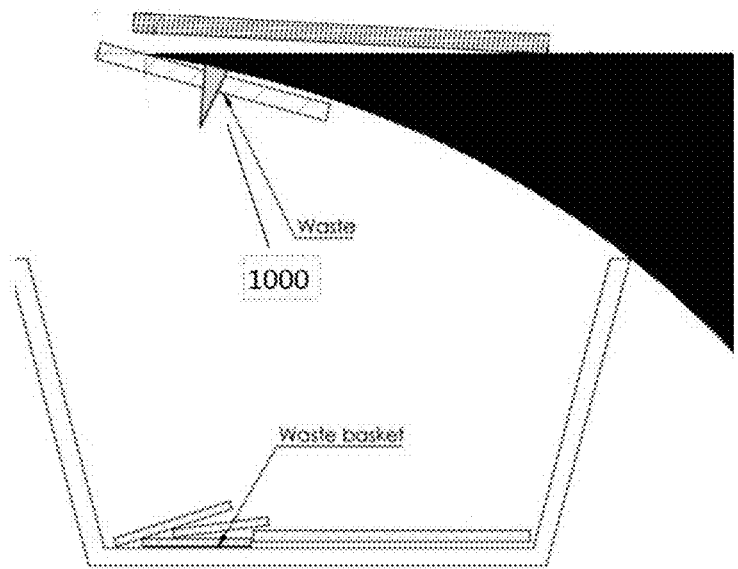
FIG. 10 is a schematic drawing illustrating an exemplary waste processing embodiment.
Figure 11:
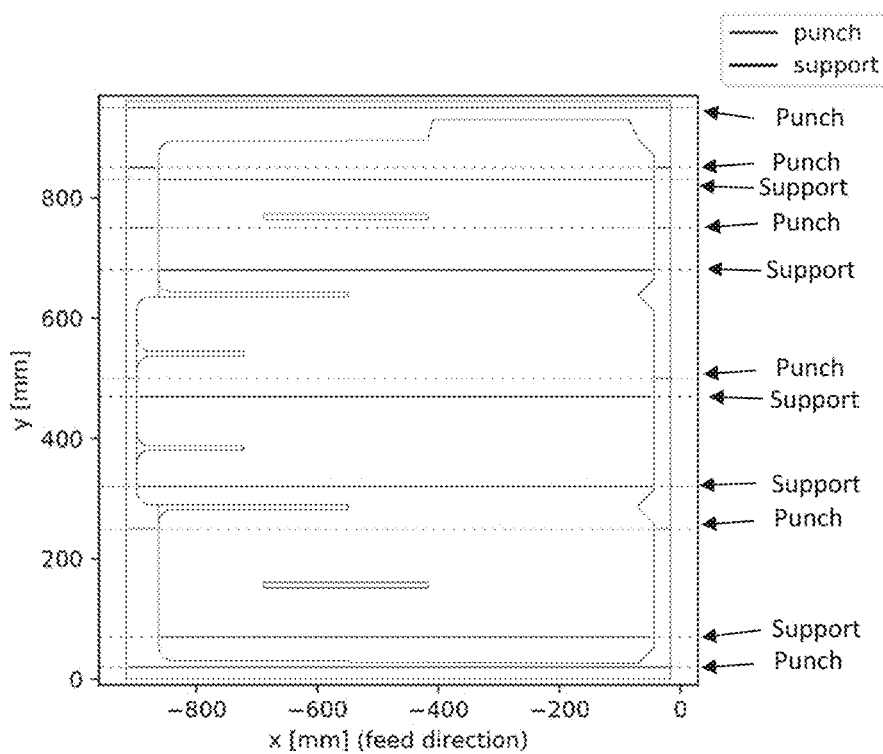
FIGS. 11-17 are schematic drawings showing additional exemplary product shapes and corresponding punch lines and support lines relating thereto.
Figure 18:
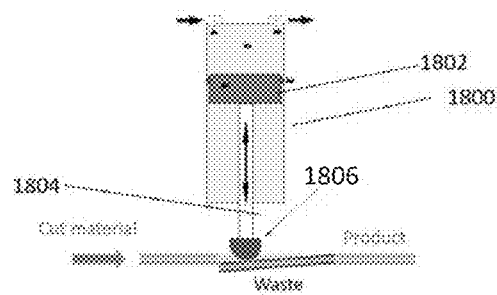
FIG. 18 is a schematic drawing depicting a rigid punch tool end.
Figure 19:
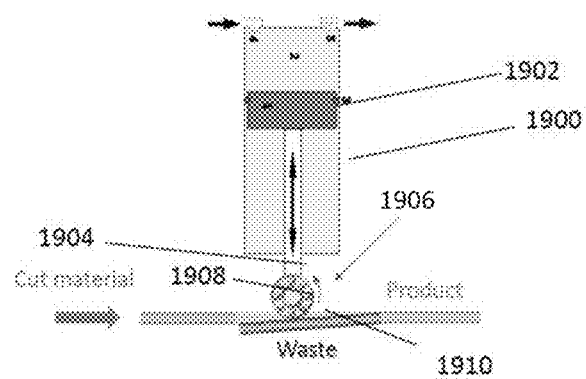
FIG. 19 is a schematic drawing depicting a roller punch tool end.
Figures 20A, 20B:
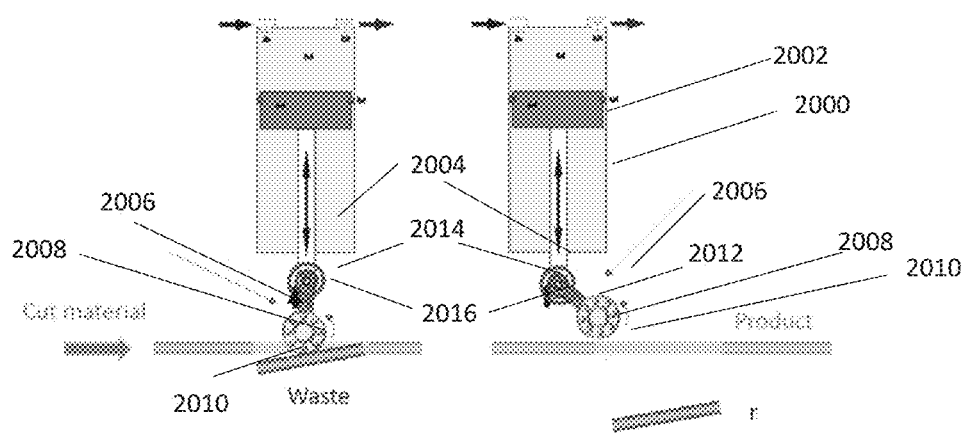
FIGS. 20A and 20B are schematic drawings depicting exemplary positions of an exemplary semi-stable pivotable punch tool end.

The equipment for waste handling may include equipment for further processing of the separated waste material, such as by shredding or compacting it to reduce total waste volume, or equipment for transporting the waste, such as physically or pneumatically, for disposal, burning, recycling and the like. The separation process may benefit from minimizing the number of punching actuators, and if no strip lines (to cut waste areas into smaller chunks) are applied during the conversion (cutting and creasing) process, waste size may be very large. Referring now to FIG. 10, in one embodiment, a row of knives may be disposed in the wedge. Transverse spacing between adjacent knives define the width of the waste. The knives may be replaceable, to facilitate maintaining sharpness. Very long pieces of waste may be further divided by an actuated knife (not shown) configured to move back and forth in the transverse direction along the width of the wedge The punch tools may have rigid contact ends, such as in the embodiments depicted in FIGS. 18 and 19, or the ends may have one or more sections that are non-rigid, such as the embodiments depicted in FIGS. 20A and 20B. For example, punch tools comprising elastic or yielding parts may be used to avoid conflict when punching waste that has a short extension in the feed direction, thus ensuring the tool yields if/when the product hits the tool in the feed direction. Such non-rigid parts may include, for example, a rubber (or synthetic elastomer) contact end or a "semi-stable" pivot as depicted in FIGS. 20A and 20B (two or more rigid components with a biased hinge that permits the components to move relative to one another in a predetermined direction upon receipt of a sufficient degree of force, but then spring back to the original position). The term "yielding end" refers to any contact end configured to yield in response to a force having a vector in a direction of material travel along the material path. The punch tools may also comprise bearings or rollers at the contact point with the substrate, such as the rollers shown in FIGS. 19, 20A and 20B, to minimize friction between the substrate and the punch tool during the relative motion caused by the material feed.

Figure 21:
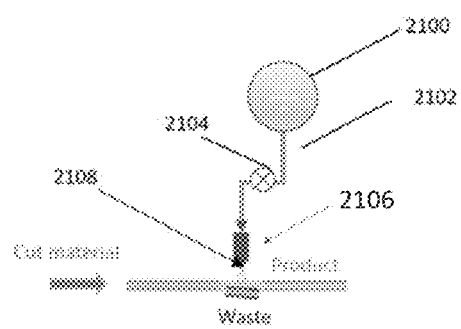
FIG. 21 is a schematic drawing depicting an exemplary air punch tool

Instead of or in addition to punch pistons, punch tools 30 may comprise one or more pressurized air nozzles arranged along the punch tool array, such as is illustrated in FIG. 21, to blow out waste parts that are too small to reliably be handled by physical punch tools at a given material feed speed. This may enable stripping of waste parts having a smaller dimension in the feed direction using a greater material feed rate than might otherwise be imposed as limitations due to punch tool actuation/retraction speed and control system sample time.

Referring now in more detail to the embodiments depicted in FIGS. 18-21, FIG. 18 shows a punch tool 1800 comprising a movable piston 1802 connected to a shaft 1804, with a rigid end 1806 on the shaft. As the cut material moves underneath the piston it strokes downward at the appropriate time so that the waste is separated from the product. In an alternate embodiment depicted in FIG. 19, punch tool 1900 comprises movable piston 1902 connected to a shaft 1904, and a roller 1906 attached to shaft 1904 at a bearing 1908 that defines an axis upon which wheel 1910 can rotate.

Referring now to the embodiments depicted in FIGS. 20A and 20B, depicting the same punch tool 2000 in different configurations experienced during the punch process. Movable piston 2002 is connected shaft 2004, which has a semi-stable pivotable end 2006 connected to the shaft. The semi-stable pivotable end 2006 comprises rigid component 2012 connected to shaft 2004 at a hinge 2016 biased by a spring 2014 that permits components 2004 and 2012 to move relative to one another in a predetermined direction (as shown in FIG. 20B relative to FIG. 20A) upon receipt of a sufficient degree of force, but then spring back to the original position. At the end of member 2012 is mounted a wheel 2010 and hub 2008, similar to the arrangement depicted in FIG. 19. Thus, in a first position shown in FIG. 20A, the linkage comprising shaft 2004, member 2012 and wheel 2010 are relatively vertically aligned and are semi-stable (sufficiently stable to direct a suitable downward punching force). When the wheel 2010 is struck by the edge of the product after punching out the waste, as is shown in FIG. 20B, member 2004 rotates relative to shaft 2012 at the hinge 2016, and then spring 2014 subsequently biases the linkage sufficient to return it to the semistable position before the next section to be punched.

In the embodiment depicted in FIG. 21, a pressurized air supply 2100 is connected to conduit 2102 having at least one control valve 2104 disposed in the conduit. When activated by a controller, control valve 2104 opens and causes nozzle 2106 to direct a predetermined flow of air 2108 at the portion of waste desired to be punched away.

It should be understood that a single machine may have more than one of the types of punch tools depicted herein, and that a bank of one type of tool may be spaced from a bank of another type of tool sequentially in the material flow. For example, a first bank of punch tools with semi-stable pivotable ends may be located upstream of a bank of air nozzle punch tools. In other embodiments, air nozzle punch tools may cooperate with other types of punch tools simultaneously on a single bank of punch tools.

In exemplary embodiments, the puncher provides flexibility to strip virtually any cut sheet according to a digital job description and processed data therefrom, without the need to make tailored strip tools (like dies) or the need to manually configure/adjust the tools to fit the waste areas of the sheet. This permits production to run continuously, and in some embodiments, to adapt to the job layout on the fly, digitally. Embodiments of the invention may permit production series ranging from single copy to long run production without the need to change setup or tools.

One challenge may be posed by out-of-plane rotation of pieces of waste. As used herein, the term "out-of-plane" rotation refers to pieces of waste that, instead of bending vertically down relative to the plane of the substrate feed, as intended, cause rotation of the substrate out of the planar feed path. Such rotation may be minimized using one or more tilt preventers 60, 70, 90. Rotation of the waste may also be minimized by using support from below downstream of the punch between the wedge and the waste. A waste removal system that quickly removes waste separated from the substrate may be important in some embodiments to maximize the ability of the machine to achieve successful separation.

Certain geometries may be particularly tricky for separation. For example, large sections of waste may produce a bending load that adversely affects operation. In such instances, the use strip-cuts (e.g. cutting the otherwise large waste area into a plurality of strips or sub-parts, rather than a single part) may reduce bending load.

The punch and support tools are preferably adjustable at least in the transverse direction and may also be adjustable in the longitudinal direction (along the plane defined by the material path) and vertically (perpendicular to the material path). The adjustability may be manual or automatic, and may include adjustability on the fly. As noted above, the separation edge may also be adjustable in the longitudinal and/or vertical directions, including manually, automatically, and on the fly.

Figures 23A, 23B, 23C:
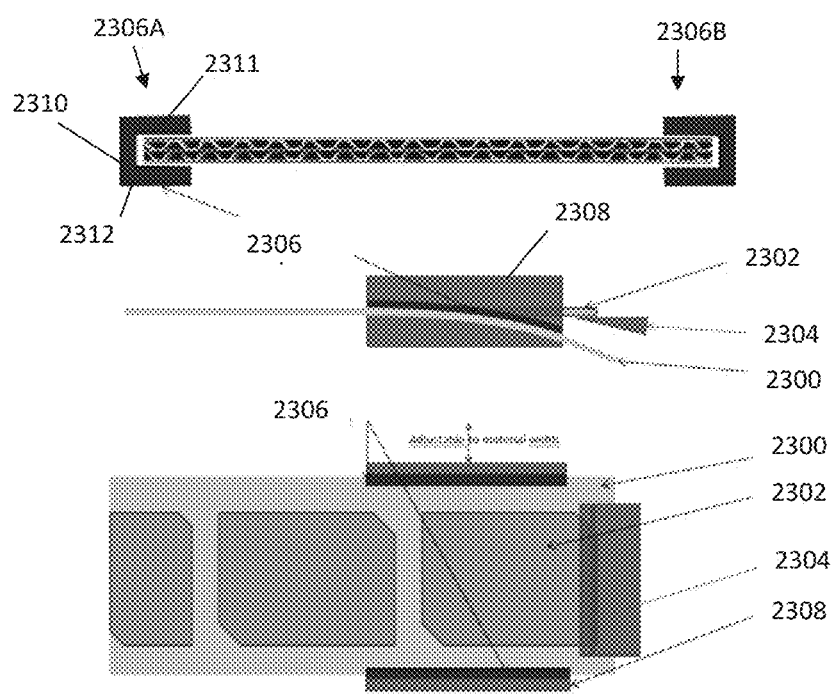
FIG. 23A-23C are schematic drawings respectively depicting a cross section, a side plan view, and top plan view of an exemplary fixed outer waste guide.

Embodiments of the system may also have additional components to help separate the waste from the product. For example, referring now to FIGS. 23A-23C, nearly all jobs have a peripheral or external waste frame 2300 that is located on the peripheral sides of the product 2302. Rather than having punching tools on each side to guide the waste frame underneath separation edge 2304, a simple, slightly curved, fixed guide profile 2306 may be used. The guide profile may comprise a first C-shaped guide portion 2306A on a first side of the material, the term "C-shaped" meaning that the guide in cross-section has a lateral wall 2210 that is positioned adjacent the edge of the material, a ceiling 2211 that partially extends over the top surface of the material and a floor 2312 that partially extends under the bottom surface. Guide portion 2306B on the opposite side of the material is essentially a mirror image or 90 degree rotation of guide portion 2306A. Each guide portion of the guide profile 2306 may be mounted in a carrier 2308 that is transversely adjustable to allow adjustment of the transverse distance between guide portions 2306A and 2306B to fit different sheet widths.

Control System

Figure 3:
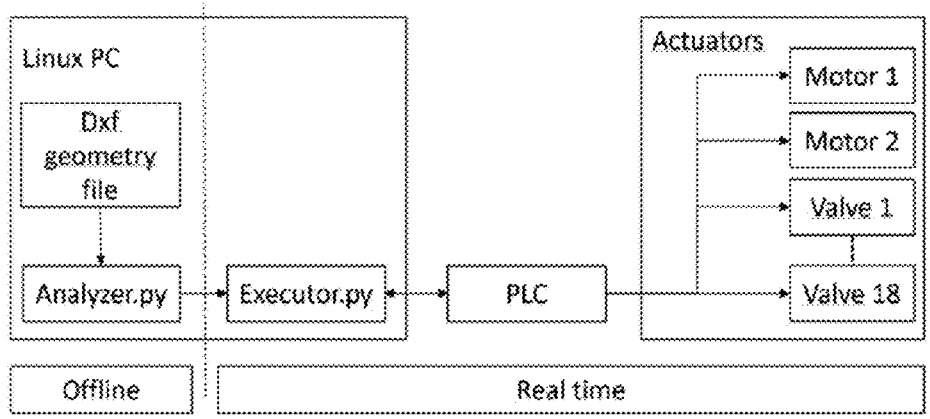
FIG. 3 is a schematic of an exemplary control system for the waste separator of FIG. 1.

With reference to FIG. 3, the components of the exemplary control system will now be described in more detail.

Analyzer.py

Analyzer.py refers to a program running on a computer, such as a Linux PC, but not limited to any particular type of computer or operating system, is a primary component of the "Offline" portion of the control system. By "offline," it is meant that the operations of this module occur before a substrate is fed into the separator. The analyzer.py is configured to plan the actuation sequence of the punches and supports. As an input, it receives (1) the job description file (e.g. a dxf file containing the cut job geometry) and (2) the distribution of punch tools and support tools corresponding to the separator. Through analysis of the cut lines in the dxf file and the paths of the punches and supports relative to the product and waste portions as the substrate will be fed into the separator, the correct points of actuation are calculated. The output of the program is a file containing an actuation plan for controlling the punch and support tools relative to the location of the substrate relative to the separation edge.

Executor.py

Executor.py refers to a program also running a computer, which may be the same computer running the analyzer.py module, such as a Linux PC, but not limited to type of computer or operating system, and is a "real-time" (e.g. within 1 ms) element of the control system. The "real-time" response is not limited to any particular standard for delay, which standard may be dependent upon the speed of the substrate through the system, the resolution of the waste and product separations, and the speed of the actuators controlling the punch and support tools. It should be understood, however, that all communications have some degree of latency, even if measured in very small fractions of time, and that "real-time" is intended to include a degree of latency that is considered acceptable by those of skill in the art for the overall conditions, and that such latency is considered along with other factors when determining the speeds of operation of the equipment. The Executor.py receives the actuation plan instructions from Analyzer.py as its main input, and it also receives feedback, such as input motor states (position, speed and acceleration) from the PLC (programmable logic controller), such as via UDP (Universal Datagram Protocol) (1 ms communication). The invention is not limited to any particular communication protocol, however. The invention is also not limited to any particular type of controller for controlling the actuators, or any particular type of PLC.

The Executor.py module controls the timing of the separation process. The Executor.py module sends commands for motor speeds (e.g. for controlling the inlet rollers) and valve actuation (e.g. for controlling activation of the punches and supports) to the PLC, such as via UDP. Valve actuation positions relative to substrate location are read from the actuation plan, and the optimal actuation time may be derived by extrapolating the expected motor position through knowledge of motor actual speed, max speed and acceleration, or by receiving feedback from sensors integrated with the motor and reporting back to the executor.py module in real time. Whether extrapolated or based on sensors relating to motor position, any information regarding location of the substrate based upon such measures will only be an "expected" location, not an absolute location, due to potential slippage between the substrate and the rollers. In other embodiments, however, the information relating to substrate location may be provided by other means, such as using machine vision, registration marks, or other feedback from sensors to determine the actual position of the substrate in real-time, to minimize any errors that could be introduced from substrate slippage relative to the roller motor positions.

The PLC is configured to control the various actuators (motors, solenoid valves, etc.) that provide operability of the separator. The PLC communicates with the Executor.py module on the computer processor via any communication protocol known in the art, such as but not limited to UDP, and may communicate with the different actuators through wired or wireless protocols, such as via EtherCAT, but the invention is not limited to any specific wired or wireless communication configuration or construction. In some implementations, the executor.py and the PLC may reside on the same computer, which may be a computer mounted on the separator apparatus, or connected (via wire or wirelessly) to the various actuators.

The actuators depicted in FIG. 3 refer to the physical elements that control the separation processing. For example, Motor 1 and Motor 2, as depicted in FIG. 3, may refer to the stepper motors that control the active inlet and outlet feed rollers, and Valves 1 through 18 may refer to the solenoid valves configured to control the punch tools, support tools and upper feed roller positioners.

EXAMPLE

An exemplary prototype separator in accordance with the figures was built for testing proof of concept. The details discussed below therefore relate only to a single embodiment and are not intended to be limitations, unless such limitations are expressly recited in the claims that follow. The exemplary prototype included the following features.

Punch tools in the prototype unit comprised air pistons connected to a source of compressed air and controlled by solenoid valves. Specifically, the prototype utilized air pistons manufactured by CKD Corporation of Aichi, Japan, Model SSD-K-12-20 (12 mm piston, 20 mm stroke length). The air pistons were controlled by monostable, single solenoid valves manufactured by Festo of Esslingen am Neckar, Germany, specifically model VUVG-LK10-M52-AT-M5-1H2L-S solenoid valves. The end of each piston was provided with an M3 cap nut (a female threaded nut having a rounded cap for making contact with the substrate, suitable for mounting on the threaded ends of the pistons), to provide a smooth sliding surface for the material to be separated. The prototype machine was fitted with 8 punches distributed over a transverse length of approximately 1.2 meters, each having a diameter of approximately 5 mm but it should be understood that the invention is not limited to any specific number of punches.

The support tools used in the prototype were also air pistons controlled by solenoid valves identical to those described above for the punch tools. It should be understood, however, that in other embodiments, different types of tools may be used for the punch and support tools. Similarly, the end of each support piston was provided with an M3 cap nut, but different ends may be used for the support and punch tools. The prototype was fitted with 6 support tools.

In the prototype, the angle of the separation wedge relative to the plane of the substrate path was approximately 20 degrees. The separation edge at the leading edge of the separation wedge was also used as the zero line for registration of the machine vertical (Z) and inlet feed (X) directions.

In the prototype, a friction enhancing material was adhered to the lower inlet roller and a spiral of soft rubber material was adhered to the upper inlet roller. The lower outlet roller had a friction enhancing material sprayed onto the surface of the roller. The lower inlet roller was controlled by a stepper motor, as was the lower outlet roller.

The control system analyzer.py and executor.py modules were run on a PC running the Linux operating system. The real-time operating speed of the control system was 1 ms. The PLC in the prototype communicated with the Executor.py module running on the PC via UDP and with the different actuators through EtherCAT connections.

Other attributes of the prototype machine were as follows:
Spacing between supports and punches: 100-300 mm
Height of separation edge below contact surface of lower inlet roller: approx. 3 mm
Distance from axis of inlet roller (center) to separation edge: approx. 100 mm
Height of separation edge above fully extended punch tool end: approx. 4 mm
Height of separation edge below fully extended support tool end: approx. 3 mm
Distance from separation edge to center of punch: approx. 13 mm
Distance from separation edge to center of support: approx. 23 mm
Height of separation edge below contact surface of Tilt preventer 70: 7 mm.

It should be understood that the foregoing dimensions are only exemplary, and that the invention is not limited to any particular geometry or configuration of the components. It should be further understood that preferred embodiments may be adjustable in one or more the foregoing dimensions to facilitate use of the separator in connection with substrates of different thicknesses, material types, and fineness of the details of the waste or product to be separated from one another.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A separator for separating waste from product in a pre-cut substrate having one or more cut lines that are coincident with a boundary between product and waste, the separator comprising:

an inlet feeder, feeds the pre-cut substrate into the separator along a plane that comprises a material path in a material feed direction;

a separation wedge comprising a separation edge, wherein the separation wedge is disposed in a location below the material path and downstream of the inlet feeder along the material path, wherein the separation edge is positioned below the plane of the material path and wherein the separation edge is a leading edge of the separation wedge;

a plurality of tools including at least a plurality of punch tools disposed above the plane of the material path, upstream of the separation wedge, each tool having a tool actuator, each punch tool having a punch tool actuator that positions the punch tool in an extended position in which a contact end of the punch tool is disposed below the separation wedge, and a retracted position in which the contact end of the punch tool is disposed above the plane of the material path; and a controller commands each punch tool actuator to position the corresponding punch tool contact end synchronized with a position of the pre-cut substrate relative thereto to separate the waste from the product at the separation wedge;

a machine vision system detects a leading edge of the waste and a leading edge of the product; and wherein the separation wedge has an adjustable longitudinal position between a position wherein the separation wedge is relatively closer to the punch tools and a position wherein the separation wedge is relatively further from the punch tools, an adjustable distance relative to the plane of the material path, or a combination thereof, and the controller moves the separation wedge to facilitate separation of the product from the waste based upon the detected positions of the leading edge of the waste and the leading edge of the product.

2. The separator of claim 1, wherein the plurality of tools further comprises:

a plurality of support tools disposed below the plane of the material path, upstream of the plurality of punch tools, each support tool comprising a support tool actuator that positions a contact end of the support tool in an extended position in which the contact end of the support tool is disposed above the separation wedge, and a retracted position in which the contact end of the support tool is disposed below the plane of the material path;

wherein the controller commands each support tool actuator to position the corresponding support tool contact end synchronized with the position of the pre-cut substrate relative thereto to separate the product from the waste at the separation wedge.

3. The separator of claim 1, further comprising:

an outlet feeder for transporting the product along a product path downstream of the separation wedge.

4. The separator of claim 3, wherein at least one of the inlet feeder or the outlet feeder comprises a pair of cooperating conveyors disposed on opposite sides of the plane of the material path and contacting the substrate, at least one of said pair of cooperating conveyors comprising active conveyors to transfer directional force to the substrate or product.

5. The separator of claim 4, wherein at least one of the cooperating conveyors is a roller.

6. The separator of claim 4, wherein at least one of the cooperating conveyors is a conveyor belt.

7. The separator of claim 4, wherein at least one of the inlet feeder or the outlet feeder comprises an actuator, the actuator moves at least one of the pair of cooperating conveyors into and out of an engaged position in which the substrate is compressed between the cooperating conveyors.

8. The separator of claim 1, further comprising:

a waste handler disposed beneath the separation wedge for receiving the waste.

9. The separator of claim 8, further comprising a fixed waste guide comprising transversely spaced guide portions guide a peripheral waste frame into the waste handler without use of a punch tool.

10. The separator of claim 9, wherein the transversely spaced guide portions are each mounted on a carrier, wherein the carrier adjusts a transverse distance between the guide portions.

11. The separator of claim 1, wherein the separation wedge has an adjustable wedge angle.

12. The separator of claim 1, wherein the separation wedge has an adjustable longitudinal position between a position in which the separation wedge is relatively closer to the punch tools and a position in which the separation wedge is relatively further from the punch tools, an adjustable distance relative to the plane of the material path, or a combination thereof.

13. The separator of claim 1, further comprising a machine vision system which detects one or more registration marks, and a job description file containing information to position one or more of the cut lines in the substrate relative to the one or more registration marks, wherein the pre-cut substrate is marked with the one or more registration marks in a machine-readable form, and wherein the cut line is a boundary between product and waste.

14. The separator of claim 1, further comprising at least one processor connected to the controller, the processor programmed with instructions that generate actuation commands to the controller synchronized with information indicative of substrate position, the actuation commands comprising at least one of: instructions for the tool actuators, and instructions for operating the inlet and outlet feed conveyors.

15. The separator of claim 14, wherein the at least one processor is programmed with instructions (a) to read a job description file corresponding to the pre-cut substrate, the job description file specifies the one or more of the cut lines, and (b) to derive the actuation commands from the cut lines in the job description file.

16. The separator of claim 14, wherein the at least one processor receives and processes information from the machine vision system relating to positions of the leading edges of the waste and the product and to send actuation commands to the controller for moving the separation wedge based upon the positions.

17. The separator of claim 1, wherein one or more of the plurality of tools is adjustable in at least one direction.

18. The separator of claim 1, wherein the contact end of at least one of the plurality of tools comprises a roller.

19. The separator of claim 1, wherein the contact end of at least one of the plurality of tools comprises a yielding end to yield in response to a force having a vector in a direction of material travel along the material path.

20. The separator of claim 1, further comprising one or more air nozzles connected to a source of pressurized air disposed relative to the plurality of punch tools operative to direct a stream of air toward the substrate to separate waste from the product in the pre-cut substrate.

21. The separator of claim 1, wherein the separator comprises a module in a workflow comprising at least one other module located upstream or downstream thereof, wherein the at least one other module is selected from the group consisting of: equipment for performing cutting, creasing, printing or a combination thereof, equipment for performing gluing, sorting, stacking, or a combination thereof, and equipment for waste handling.

22. The separator of claim 21, wherein the workflow comprises upstream cutting equipment cutting a tapered cut that has a non-perpendicular angle between the top surface and the bottom surface of the material.

23. A method for separating waste from product in a pre-cut substrate using the separator according to claim 1, the method comprising:

feeding the pre-cut substrate into the separator along the plane;

providing the separation wedge comprising the separation edge, disposing the separation wedge in the location below the material path and in the location downstream of the inlet feeder along the material path, and forming, by the separation edge located below the plane of the material path; and actuating a plurality of tools;

separating the product from the waste at the separation wedge, the plurality of tools comprising at least the plurality of punch tools including the contact end; the contact end urging the waste portion of the pre-cut substrate to pass below the separation wedge, the actuation of the plurality of punch tools synchronized with a position of the pre-cut substrate.

24. The separator of claim 1, wherein the separation edge is tapered.

25. The separator of claim 1, wherein the separation edge is a tapered end of the separation wedge.

26. The separator of claim 1, wherein an entirety of the separation edge is disposed below the plane of the material path.

27. The separator of claim 1, wherein an entirety of the separation wedge is disposed below the plane of the material path.

28. The separator of claim 1, wherein an entirety of the separation wedge is disposed downstream of the plurality of punch tools.

* * * * *